US011140715B2

(12) United States Patent
Ly et al.

(10) Patent No.: US 11,140,715 B2
(45) Date of Patent: Oct. 5, 2021

(54) WAVEFORM-DEPENDENT RANDOM ACCESS CHANNEL PROCEDURE

(71) Applicant: QUALCOMM Incorporated, San Diego, CA (US)

(72) Inventors: Hung Ly, San Diego, CA (US); Hao Xu, Beijing (CN); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 619 days.

(21) Appl. No.: 15/793,223

(22) Filed: Oct. 25, 2017

(65) Prior Publication Data
US 2018/0116000 A1    Apr. 26, 2018

Related U.S. Application Data

(60) Provisional application No. 62/413,314, filed on Oct. 26, 2016.

(51) Int. Cl.
*H04W 74/08* (2009.01)
*H04W 74/00* (2009.01)
(Continued)

(52) U.S. Cl.
CPC ..... *H04W 74/0833* (2013.01); *H04W 74/006* (2013.01); *H04B 7/2628* (2013.01);
(Continued)

(58) Field of Classification Search
None
See application file for complete search history.

(56) References Cited

U.S. PATENT DOCUMENTS

2010/0232364 A1\*  9/2010  Hsu ............... H04W 74/085
                                                       370/328
2013/0121280 A1    5/2013  Ouchi et al.
(Continued)

FOREIGN PATENT DOCUMENTS

| WO | WO2017088898 A1 | 6/2017 |
| WO | WO2017096131 A1 | 6/2017 |
| WO | WO2017156224 A1 | 9/2017 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP Standard: 3GPP TS 36.300, 3rd Generation Partnership Project (3GPP), Mobile Competence Centre, 650, Route Des Lucioles, F-06921 Sophia-Antipolis Cedex, France, vol. RAN WG2, No. V14.0.0, Sep. 29, 2016 (Sep. 29, 2016), pp. 1-314, XP051172664, [retrieved on Sep. 29, 2016].

(Continued)

*Primary Examiner* — Gregory B Sefcheck
*Assistant Examiner* — Srinivasa R Reddivalam
(74) *Attorney, Agent, or Firm* — Kevin T. Cheatham

(57) ABSTRACT

Techniques are described for wireless communication. A method for wireless communication at a user equipment (UE) includes receiving an indication of at least one receive capability of a network access device; transmitting a first message of a random access channel (RACH) procedure; receiving a random access response (RAR) message in response to transmitting the first message; and interpreting the RAR message according to a format based at least in part on the received indication. A method for wireless communication at a network access device includes transmitting an indication of at least one receive capability of the network access device; receiving, from a UE, a first message of a
(Continued)

RACH procedure; and transmitting a RAR message to the UE in response to receiving the first message. The RAR message has a format based at least in part on the at least one receive capability of the network access device.

58 Claims, 18 Drawing Sheets

(51) Int. Cl.
*H04L 1/00* (2006.01)
*H04B 7/26* (2006.01)

(52) U.S. Cl.
CPC .......... *H04L 1/0003* (2013.01); *H04L 1/0023* (2013.01); *H04W 74/008* (2013.01)

(56) References Cited

U.S. PATENT DOCUMENTS

| | | |
|---|---|---|
| 2017/0013610 A1 | 1/2017 | Lee et al. |
| 2018/0255586 A1* | 9/2018 | Einhaus ............ H04W 72/0413 |
| 2018/0324681 A1* | 11/2018 | Yilmaz ............... H04W 74/004 |
| 2019/0029005 A1* | 1/2019 | Bendlin ................ H04L 5/0053 |
| 2019/0104549 A1* | 4/2019 | Deng ................... H04B 7/0617 |
| 2019/0141746 A1* | 5/2019 | Hong ................ H04W 74/0833 |
| 2019/0173546 A1* | 6/2019 | Kim ...................... H04L 5/0051 |
| 2019/0174513 A1* | 6/2019 | Loehr ............... H04W 72/1242 |
| 2019/0239214 A1* | 8/2019 | Yang ..................... H04L 1/1887 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)", 3GPP Standard; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V14.0.0, Oct. 4, 2016 (Oct. 4, 2016), XP051172918, pp. 1-644, [retrieved on Oct. 4, 2016].

International Search Report and Written Opinion—PCT/US2017/058473—ISA/EPO—dated Feb. 2, 2018.

Mitsubishi Electric Corporation: "alProposs for 5G Technologies", 3GPP Draft; RWS-150014_Mitsubishielectriccorp_5GProposals, 3rd Generation Partnership Project (3GPP), Mobile Competence Centre; 650, Route Des Lucioles; F-06921, Sophia-Antipolis Cedex; France, vol. TSG RAN, No. Phoenix, AZ, USA; Sep. 17, 2015-Sep. 18, 2015; Sep. 1, 2015 (Sep. 1, 2015), 13 slides, XP051045502, Retrieved from the Internet: URL:http://www.3gpp,org/ftp/workshop/2015-09-17_18_RAN_5G/Docs/, [retrieved on Sep. 1, 2015].

Taiwan Search Report—TW106136879—TIPO—dated Feb. 24, 2021.

\* cited by examiner

WAVEFORM-DEPENDENT RANDOM ACCESS CHANNEL PROCEDURE

CROSS REFERENCES

The present Application for Patent claims priority to U.S. Provisional Patent Application No. 62/413,314 by LY, et al., entitled "WAVEFORM-DEPENDENT RANDOM ACCESS CHANNEL PROCEDURE," filed Oct. 26, 2016, assigned to the assignee hereof, and which is hereby expressly incorporated by reference herein in its entirety.

BACKGROUND

Field of the Disclosure

The present disclosure, for example, relates to wireless communication systems, and more particularly to a waveform-dependent random access channel (RACH) procedure.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a next generation NodeB (gNB). A base station or smart radio head may communicate with a set of UEs on downlink channels (e.g., for transmissions from a base station or smart radio head to a UE) and uplink channels (e.g., for transmissions from a UE to a base station or smart radio head).

When initially accessing a wireless network, when accessing a wireless network after a period of time, during a handover, and on other occasions, a UE may perform a RACH procedure with the wireless network.

SUMMARY

In some wireless communications (e.g., in next generation, 5G, or new radio (NR) networks), a UE may transmit to a network access device using different uplink waveforms. For example, a UE may transmit to a network access device using a discrete Fourier transform spread orthogonal frequency-division multiplexing (DFT-s-OFDM) waveform or a cyclic prefix orthogonal frequency-division multiplexing (CP-OFDM) waveform. Some wireless communication systems (e.g., next generation, 5G, or NR networks) specify mandatory UE-support for a DFT-s-OFDM waveform and a CP-OFDM waveform, but allow a network access device to support only a CP-OFDM waveform receive capability, or both a DFT-s-OFDM receive capability and a CP-OFDM waveform receive capability. Techniques described in the present disclosure enable a UE to transmit using an appropriate waveform during a random access channel (RACH) procedure, and/or to interpret random access responses (RARs) transmitted by network access devices supporting different receive capabilities.

In one example, a method for wireless communication at a UE is described. The method may include receiving an indication of at least one receive capability of a network access device, transmitting a first message of a RACH procedure, receiving a RAR message in response to transmitting the first message, and interpreting the RAR message according to a format based at least in part on the received indication.

In one example, an apparatus for wireless communication at a UE is described. The apparatus may include means for receiving an indication of at least one receive capability of a network access device, means for transmitting a first message of a RACH procedure, means for receiving a RAR message in response to transmitting the first message, and means for interpreting the RAR message according to a format based at least in part on the received indication.

In one example, an apparatus for wireless communication at a UE is described. The apparatus may include a processor, memory in electronic communication with the processor, and instructions stored in the memory. The instructions may be executable by the processor to receive an indication of at least one receive capability of a network access device, to transmit a first message of a RACH procedure, to receive a RAR message in response to transmitting the first message, and to interpret the RAR message according to a format based at least in part on the received indication.

In one example, a non-transitory computer-readable medium storing computer-executable code for wireless communication at a UE is described. The code may be executable by a processor to receive an indication of at least one receive capability of a network access device, to transmit a first message of a RACH procedure, to receive a RAR message in response to transmitting the first message, and to interpret the RAR message according to a format based at least in part on the received indication.

In one example, a method for wireless communication at a network access device is described. The method may include transmitting an indication of at least one receive capability of the network access device; receiving, from a UE, a first message of a RACH procedure; and transmitting a RAR message to the UE, in response to receiving the first message. The RAR message may have a format based at least in part on the at least one receive capability of the network access device.

In one example, an apparatus for wireless communication at a network access device is described. The apparatus may include means for transmitting an indication of at least one receive capability of the network access device; means for receiving, from a UE, a first message of a RACH procedure; and means for transmitting a RAR message to the UE, in response to receiving the first message. The RAR message may have a format based at least in part on the at least one receive capability of the network access device.

In one example, an apparatus for wireless communication at a network access device is described. The apparatus may include a processor, memory in electronic communication with the processor, and instructions stored in the memory. The instructions may be executable by the processor to transmit an indication of at least one receive capability of the network access device; to receive, from a UE, a first message of a RACH procedure; and to transmit a RAR message to the UE, in response to receiving the first message. The RAR message may have a format based at least in part on the at least one receive capability of the network access device.

In one example, a non-transitory computer-readable medium storing computer-executable code for wireless communication at a network access device is described. The code may be executable by a processor to transmit an indication of at least one receive capability of the network access device; to receive, from a UE, a first message of a RACH procedure; and to transmit a RAR message to the UE, in response to receiving the first message. The RAR message may have a format based at least in part on the at least one receive capability of the network access device.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A waveform-dependent random access channel (RACH) procedure is described. In some examples, a UE that has multiple transmit capabilities (e.g., a cyclic prefix orthogonal frequency-division multiplexing (CP-OFDM) transmit capability and a discrete Fourier transform spread orthogonal frequency-division multiplexing (DFT-s-OFDM) transmit capability) may identify the receive capability (or capabilities) of a network access device and perform a random access channel (RACH) procedure with the network access device based at least in part on the receive capability (or capabilities) of the network access device. The UE may also perform the RACH procedure based at least in part on an indication of a type of uplink resource assignment provided by the network access device. The indication of the type of uplink resource assignment may be provided in a random access response (RAR) message transmitted by the network access device during performance of the RACH procedure.

In some examples, a waveform to be used for transmission of a first message of a RACH procedure may be predetermined (e.g., indicated in a standard or specification) or indicated by a serving network access device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
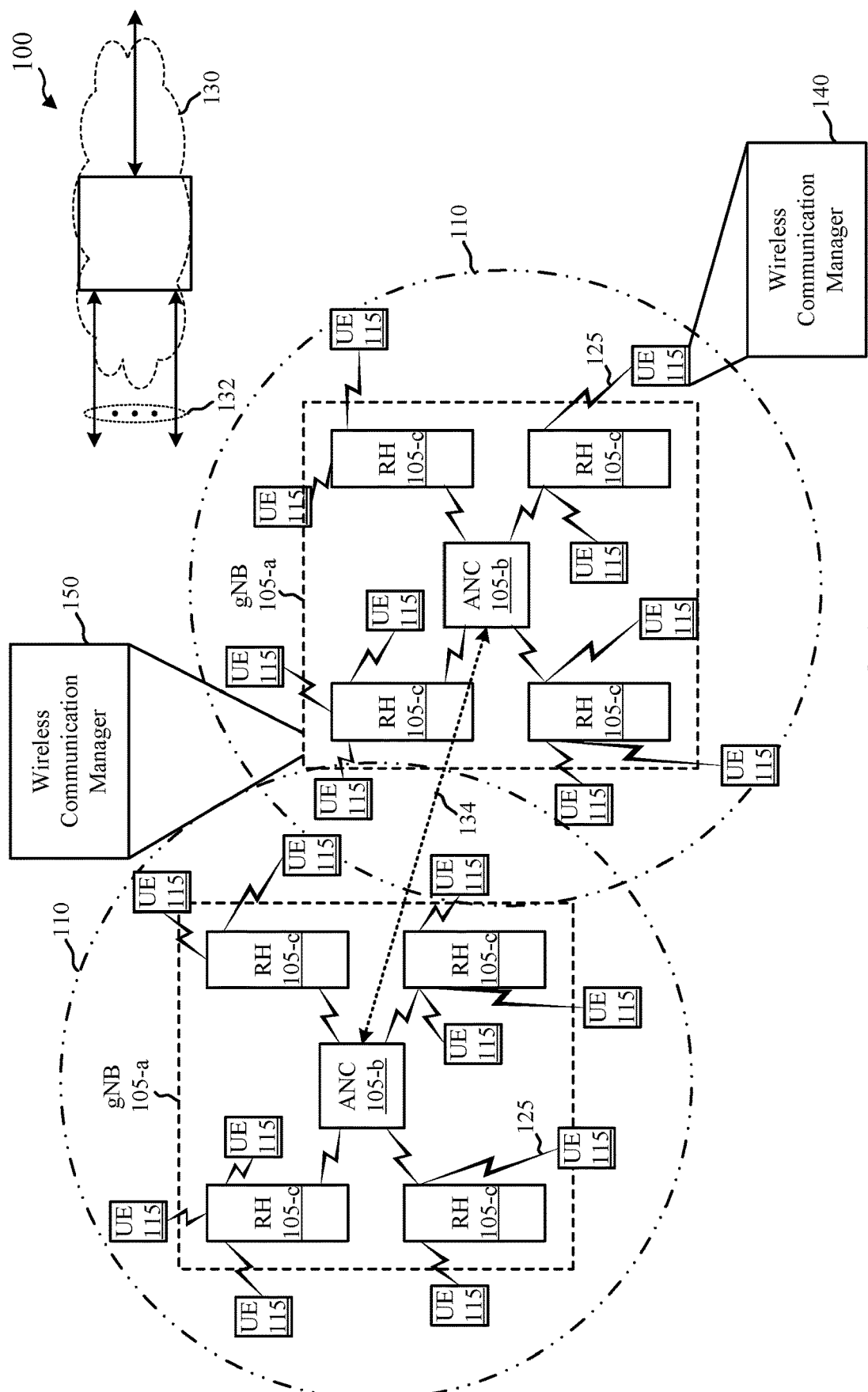
FIG. 1 shows an example of a wireless communication system, in accordance with one or more aspects of the disclosure.

FIG. 1 shows an example of a wireless communication system 100, in accordance with one or more aspects of the disclosure. The wireless communication system 100 may include network access devices 105 (e.g., next generation NodeBs (gNBs) 105-a, active noise controls (ANCs) 105-b, and/or radio heads (RHs) 105-c), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may also communicate with a number of UEs 115 through a number of smart radio heads (e.g., RHs 105-c). In an alternative configuration of the wireless communication system 100, the functionality of an ANC 105-b may be provided by a RH 105-c or distributed across the RHs 105-c of an gNB 105-a. In another alternative configuration of the wireless communication system 100 (e.g., an LTE/LTE-A configuration), the RHs 105-c may be replaced with base stations, the ANCs 105-b may be replaced by base station controllers (or links to the core network 130), and the gNBs 105-a may be replaced by evolved NodeBs (eNBs). In some examples, the wireless communication system 100 may include a mix of RHs 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or RHs 105-c may have similar frame timing, and transmissions from different gNBs 105-a and/or RHs 105-c may be approximately aligned in time. For asynchronous operation, the gNBs 105-a and/or RHs 105-c may have different frame timings, and transmissions from different gNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a RH 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of network access devices 105 (e.g., gNBs 105-a, RHs 105-c, eNBs, base stations, access points, macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a RH 105-c, and/or downlinks (DLs), from a RH 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., RHs 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

At times, a UE 115 may perform a random access procedure with a network access device 105. Random access procedures may be contention-based or non-contention-based. Contention-based random access procedures may include random access procedures performed when initially accessing a wireless network from an idle state. Non-contention-based random access procedures include, for example, random access procedures performed in conjunction with a handover procedure. Techniques described in the present disclosure pertain to both contention-based random access procedures and non-contention based random access procedures.

In some examples, a UE 115 may include a wireless communication manager 140. The wireless communication manager 140 may be used to receive an indication of at least one receive capability of a network access device 105; to transmit a first message of a RACH procedure; to receive a RAR message in response to transmitting the first message; and to interpret the RAR message according to a format based at least in part on the received indication.

In some examples, a network access device 105 may include a wireless communication manager 150. The wireless communication manager 150 may be used to transmit an indication of at least one receive capability of the network access device; to receive, from a UE 115, a first message of a RACH procedure; and to transmit a RAR message to the UE, in response to receiving the first message, the RAR message having a format based at least in part on the at least one receive capability of the network access device 105.

In some examples, a UE 115 may transmit to a network access device 105 using different uplink waveforms. For example, a UE 115 may transmit to a network access device 105 using a DFT-s-OFDM waveform (also referred to as a single carrier frequency-division multiplexing (SC-FDM) waveform) or a CP-OFDM waveform. Some wireless communication systems (e.g., next generation, 5G, or NR networks) specify mandatory UE-support for a DFT-s-OFDM waveform and a CP-OFDM waveform, but allow a network access device 105 to have just a CP-OFDM waveform receive capability, or both a DFT-s-OFDM receive capability and a CP-OFDM waveform receive capability. A UE transmit chain for generating a DFT-s-OFDM waveform or a CP-OFDM waveform are respectively shown in FIGS. 2 and 3.

Figure 2:
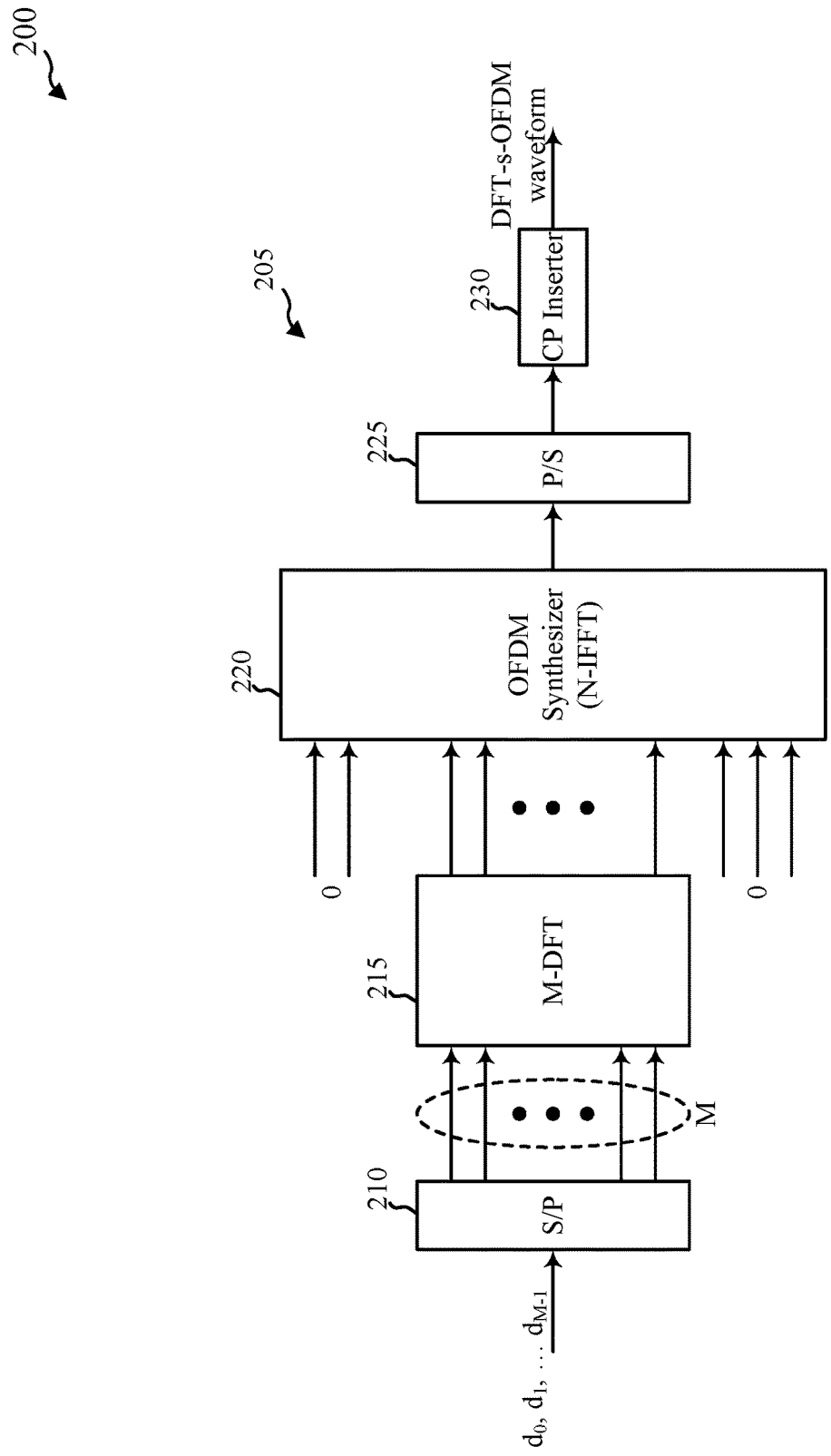
FIG. 2 shows a block diagram of a user equipment (UE) transmit chain for generating a discrete Fourier transform spread orthogonal frequency-division multiplexing (DFT-s-OFDM) waveform, in accordance with one or more aspects of the present disclosure.

FIG. 2 shows a block diagram 200 of a UE transmit chain 205 for generating a DFT-s-OFDM waveform, in accordance with one or more aspects of the present disclosure. In some examples, the UE transmit chain 205 may be included in one or more of the UEs 115 described with reference to FIG. 1. The UE transmit chain 205 includes a serial-to-parallel (S/P) converter 210, an M-input discrete Fourier transform (M-DFT) spreader 215, an OFDM synthesizer 220 (including, for example, an N-input inverse fast Fourier transform (N-IFFT) generator), a parallel-to-serial (P/S) converter 225, and a cyclic prefix (CP) inserter 230.

The S/P converter 210 may receive a sequence of complex-valued modulation symbols (e.g., $d_0, d_1, \ldots d_{M-1}$) and generate an M-bit output. The M-bit output may be received by the M-DFT spreader 215 and block-wise spread in the frequency domain. The OFDM synthesizer 220 may map a DFT-spread output of the M-DFT spreader 215 to OFDM modulation symbols, which OFDM modulation symbols may be converted to a serial stream of modulation symbols by the P/S converter 225. The CP inserter 230 may add a cyclic prefix to a group of OFDM modulation symbols to generate a DFT-s-OFDM waveform.

Figure 3:
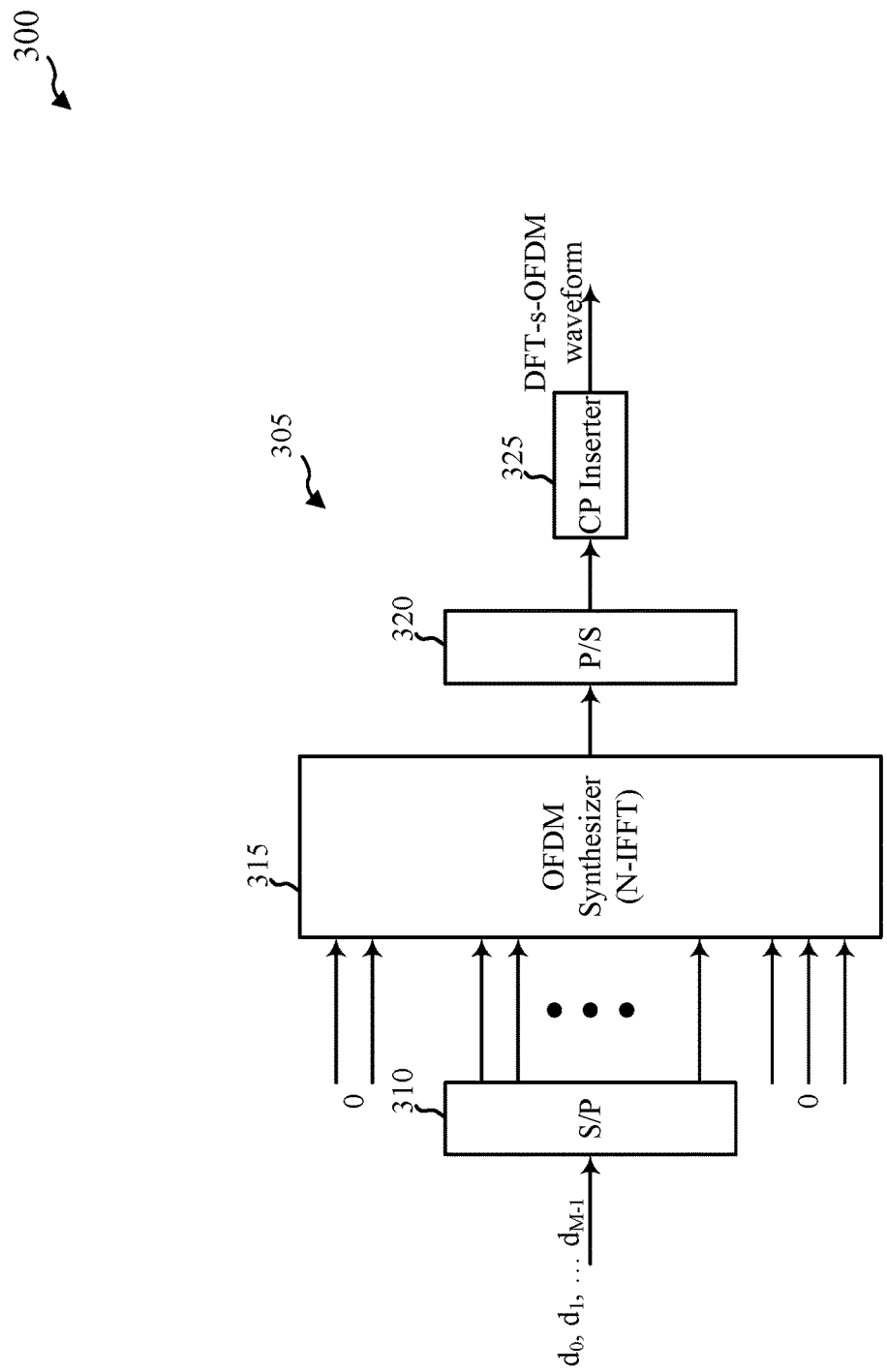
FIG. 3 shows a block diagram of a UE transmit chain for generating a cyclic prefix orthogonal frequency-division multiplexing (CP-OFDM) waveform, in accordance with one or more aspects of the present disclosure.

FIG. 3 shows a block diagram 300 of a UE transmit chain 305 for generating a CP-OFDM waveform, in accordance with one or more aspects of the present disclosure. In some examples, the UE transmit chain 305 may be included in one or more of the UEs 115 described with reference to FIG. 1. The UE transmit chain 305 includes a S/P converter 310, an OFDM synthesizer 315 (including, for example, an N-IFFT generator), a P/S converter 320, and a CP inserter 325.

The S/P converter 310 may receive a sequence of complex-valued modulation symbols (e.g., $d_0, d_1, \ldots d_{M-1}$) and generate an M-bit output. The M-bit output may be received by the OFDM synthesizer 315 and mapped to OFDM modulation symbols, which OFDM modulation symbols may be converted to a serial stream of modulation symbols by the P/S converter 320. The CP inserter 325 may add a cyclic prefix to a group of OFDM modulation symbols to generate a CP-OFDM waveform.

Figure 4:
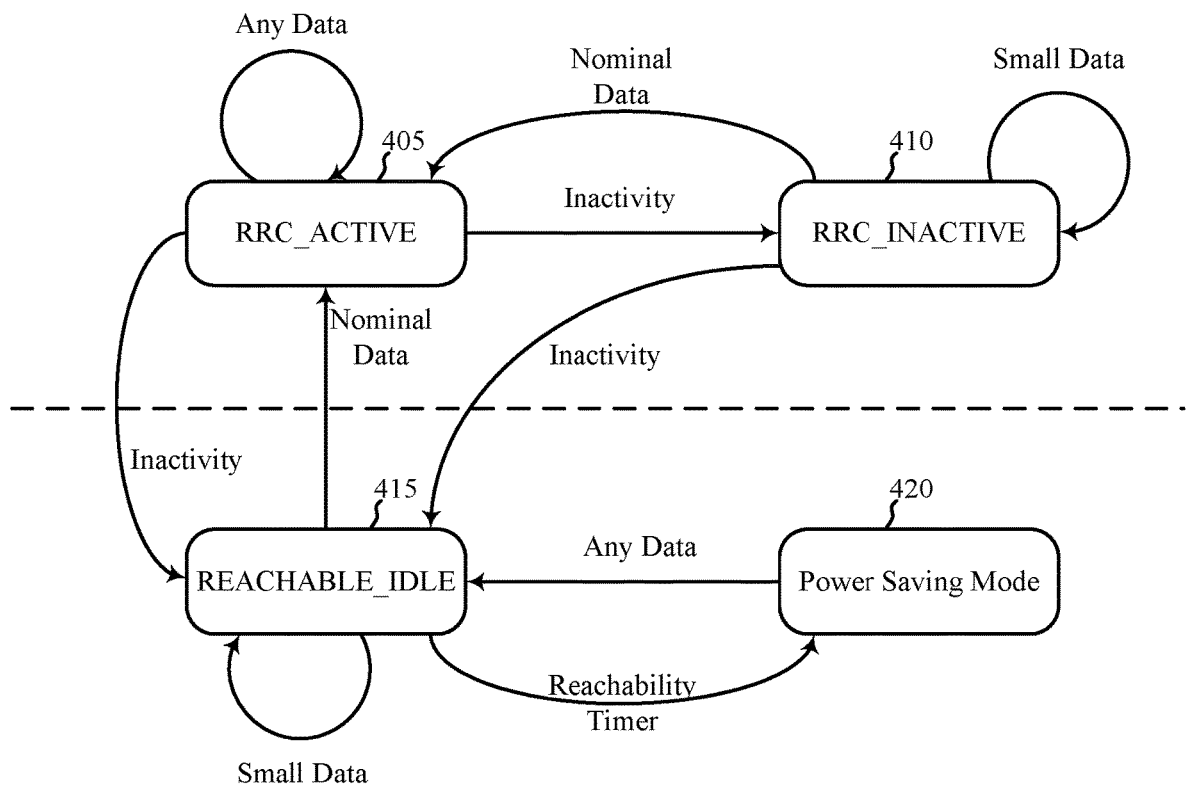
FIG. 4 shows a radio resource control (RRC) state diagram for a UE of a next generation, 5G, or new radio (NR) network, in accordance with one or more aspects of the present disclosure.

When operating within a wireless communication system, a UE may operate in a number of RRC states. By way of example, FIG. 4 shows a RRC state diagram 400 for a UE of a next generation, 5G, or NR network, in accordance with one or more aspects of the present disclosure. The RRC state diagram 400 includes four states, including a RRC_ACTIVE state 405, a RRC_INACTIVE state 410, a REACHABLE_IDLE state 415, and a Power Saving Mode 420. A UE may be in the RRC_ACTIVE state 405 or RRC_INACTIVE state 410 while in a Connected Mode with a network (e.g., a next generation, 5G, or NR network). A UE may be in the REACHABLE_IDLE state 415 or Power Saving Mode 420 while in an Idle Mode with a network (e.g., a next generation, 5G, or NR network). In some examples, the RRC state diagram 400 shown in FIG. 4 may be implemented by one of the UEs 115 described with reference to FIG. 1.

When operating in the RRC_ACTIVE state 405, in a Connected Mode, the UE's context may be maintained in a radio access network (RAN) of a wireless communication system, and the RAN may not assign the UE air interface resources. While in the RRC_ACTIVE state 405, the UE may transmit and receive any data. As long as the UE continues to transmit or receive data regularly (e.g., before an inactivity timer can expire between data transmissions or receptions), the UE may remain in the RRC_ACTIVE state 405. If the inactivity timer expires, the UE may transition to the RRC_INACTIVE state 410 and remain in a Connected Mode, or the UE may transition to the REACHABLE_IDLE state 415 and transition to an Idle Mode.

In the RRC_INACTIVE state 410, the UE's context may be maintained in the RAN, but the RAN may not assign the UE air interface resources. While in the RRC_INACTIVE state 410, the UE may transmit and receive small amounts of data. If the UE has larger amounts of data to transmit (e.g., nominal data), or if the UE receives a page indicating that the network has larger amounts of data to transmit to the UE, the UE may transition to the RRC_ACTIVE state 405. Alternatively, if the UE has very little data to transmit or receive, or if the time between data transmissions/receptions is long, the UE may transition to the REACHABLE_IDLE state 415.

In the REACHABLE_IDLE state 415, the UE's context may not be maintained in the RAN, and the RAN may not assign the UE air interface resources. While in the REACHABLE_IDLE state 415, the UE may transmit and receive small amounts of data. If the UE has larger amounts of data to transmit (e.g., nominal data), or if the UE receives a page indicating that the network has larger amounts of data to transmit to the UE, the UE may transition to the RRC_ACTIVE state 405. Alternatively, if a reachability timer expires before a next transmission/reception, the UE may transition to the Power Saving Mode 420.

In the Power Saving Mode 420, the UE's context may not be maintained in the RAN, and the RAN may not assign the UE air interface resources. While in the Power Saving Mode 420, the UE may not transmit or receive data to/from the RAN. If the UE has data to transmit, or if the UE receives a page indicating that the network has data to transmit to the UE, the UE may transition to the REACHABLE_IDLE state 415. Otherwise, the UE may remain in the Power Saving Mode 420 and conserve power.

While operating in various of the states of the RRC state diagram 400, or while operating in various states of other RRC state diagrams, a UE may perform a RACH procedure. For example (and with reference to the RRC state diagram 400), a RACH procedure may be triggered when the UE initially accesses a RAN and transitions from the REACHABLE_IDLE state 415 to the RRC_ACTIVE state 405. A RACH procedure may also be triggered during a Connected Mode handover of the UE from one network access device to another network access device (e.g., while the UE is in the RRC_ACTIVE state 405 or the RRC_INACTIVE state 410). A RACH procedure may also be triggered upon arrival (at the network) of downlink (DL) data for the UE (e.g., while the UE is in the RRC_INACTIVE state 410 or the REACHABLE_IDLE state 415). A RACH procedure may also be triggered upon the queuing of uplink (UL) data at the UE (e.g., while the UE is in the RRC_INACTIVE state 410 or the REACHABLE_IDLE state 415). A RACH procedure may also be triggered during connection re-establishment by the UE.

In some wireless communication systems, one type of RACH procedure may be performed. In other wireless communication systems, more than one type of RACH procedure may be performed. For example, in a next generation, 5G, or NR network, a four-step RACH procedure or a two-step RACH procedure may be performed. A four-step RACH procedure may be performed, for example, when a UE transitions from the REACHABLE_IDLE state 415 to the RRC_ACTIVE state 405 in FIG. 4. A two-step RACH procedure may be performed, for example, when a UE transitions from the RRC_INACTIVE state 410 to the RRC_ACTIVE state 405, or during a handover of a UE while in the RRC_ACTIVE state 405. Examples of a four-step RACH procedure and two-step RACH procedure are respectively shown in FIGS. 5 and 6.

Figure 5:
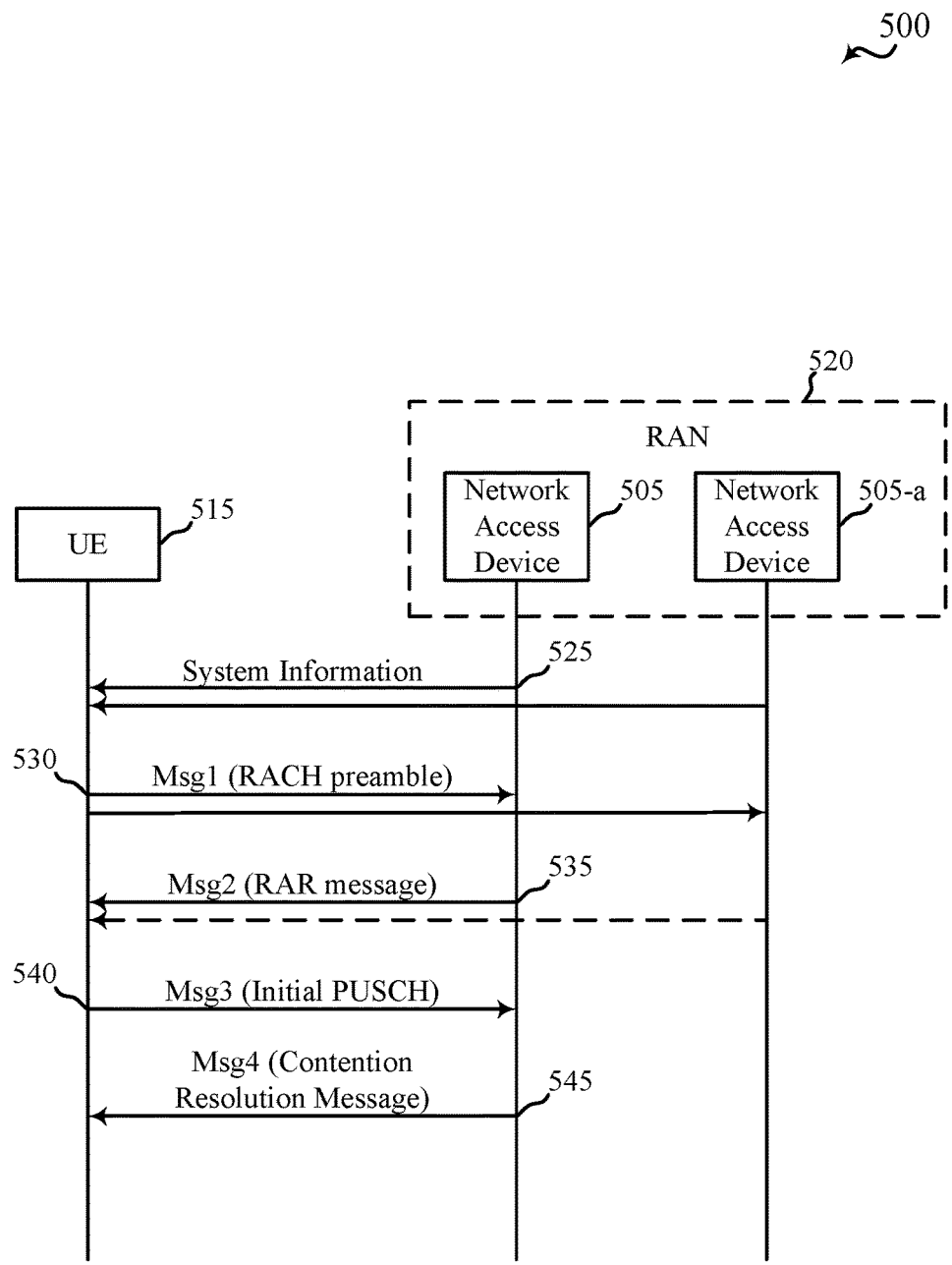
FIG. 5 shows a message flow between a UE and a radio access network (RAN) during performance of a four-step random access channel (RACH) procedure, in accordance with one or more aspects of the present disclosure.

FIG. 5 shows a message flow 500 between a UE 515 and a RAN 520 during performance of a four-step RACH procedure, in accordance with one or more aspects of the present disclosure. The UE 515 may be an example of aspects of the UEs 115 described with reference to FIG. 1. The RAN 520 may include a first network access device 505 or a second network access device 505-a, both of which may be examples of aspects of the network access devices 105 described with reference to FIG. 1. In some examples, the first network access device 505 and second network access device 505-a may be different gNBs or different smart radio heads.

The message flow 500 includes four messages, including a first message (Msg1) transmitted by the UE 515 to the RAN 520 at 530, a second message (Msg2) transmitted by the first network access device 505 to the UE 515 at 535, a third message (Msg3) transmitted by the UE 515 to the first network access device 505 at 540, and a fourth message (Msg4) transmitted by the first network access device 505 to the UE 515 at 545.

At 525, prior to the RACH procedure, one or more network access devices of the RAN 520 (e.g., the first network access device 505 and the second network access device 505-a) may broadcast system information. The system information may include, for example, an indication of at least one receive capability of the network access device. In a next generation, 5G, or NR network, the at least one receive capability may include just a CP-OFDM waveform receive capability, or both a DFT-s-OFDM receive capability and a CP-OFDM waveform receive capability. The system information may be broadcast by the first network access device 505 and the second network access device 505-a synchronously or asynchronously, at the same or different times. In some examples, the system information may be broadcast in a master information block (MIB) or a minimum system information block (MSIB). A MIB may be transmitted on a physical broadcast channel (PBCH). A MSIB may be transmitted on a physical downlink shared channel (PDSCH). In some examples, each of the network access devices 505 and 505-a may transmit a MIB and a MSIB, with the MIB being transmitted more frequently than the MSIB. By way of example, the network access devices 505 and 505-a may be radio heads associated with a common ANC (e.g., radio heads of a gNB).

At 530, a message (Msg1) including a RACH preamble may be transmitted on a physical random access channel (PRACH) of an uplink. In some examples, the RACH preamble may be selected from a plurality of preamble sequences with a cell. The UE 515 may identify the plurality of preamble sequences from system information broadcast by the network access devices 505 and 505-a of the RAN 520 (e.g., from the system information broadcast at 525). In some examples, such as when the RACH procedure is performed during an initial access or as the UE 515 transitions to a RRC Connected Mode state, the UE 515 may transmit the message at 530 in accordance with a predetermined uplink resource assignment (e.g., a CP-OFDM waveform resource assignment or a DFT-s-OFDM waveform assignment, as indicated in a standard or specification). In other examples, the first message may be transmitted according to an uplink resource assignment identified to the UE 515 by a serving network access device. For example, when the UE 515 is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a handover (HO) command received by the UE 515). In some examples, the message transmitted at 530 may be received by the first network access device 505 or the second network access device 505-*a*.

At 535, and in response to detecting the RACH preamble transmitted at 530, the first network access device 505 may transmit a RAR message (Msg2). In some examples, the RAR message may be transmitted on a physical downlink control channel PDCCH and/or a PDSCH. The RAR message may include, for example, an identifier (ID) of the detected RACH preamble, timing advance (TA) information, a downlink grant (e.g., for a PDSCH), an uplink grant (e.g., a grant of transmission resources on a physical uplink shared channel (PUSCH)), a temporary cell radio network temporary identifier (TC-RNTI), a backoff indicator (e.g., an indicator of how long the UE 515 should wait before performing another RACH procedure when contention for resources prevents the UE 515 from completing the RACH procedure initiated at 530), and/or other information or parameters. If the first network access device 505 does not detect the RACH preamble transmitted at 530, the first network access device 505 will not transmit a RAR message at 535. Upon detecting (or not detecting) the RACH preamble transmitted at 530, the second network access device 505-*a* may also transmit (or not transmit) a RAR message to the UE 515.

Upon receiving a RAR message transmitted at 535, the UE 515 may demodulate the RAR message based at least in part on the ID of the RACH preamble transmitted by the UE 515 at 530.

At 540, the UE 515 may transmit an initial PUSCH (Msg3) using the transmission resources associated with the uplink grant included in the RAR message transmitted at 535. The initial PUSCH transmission may include an RRC Connection Request message, a scheduling request (SR), an identifier of the UE 515 (i.e., a UE identifier), a tracking area update (TAU), and/or other information or parameters. The initial PUSCH transmission may be scrambled using a TC-RNTI included in the RAR message. Upon transmitting an initial PUSCH transmission at 540, the UE 515 may start a contention resolution timer.

At 545, and in response to decoding the initial PUSCH transmission of the UE 515 at 540, the first network access device 505 may transmit a contention resolution message (Msg4) to the UE 515. In some examples, the contention resolution message may be transmitted on a PDCCH and/or a PDSCH, and may be scrambled using the same TC-RNTI used to scramble the initial PUSCH transmission transmitted at 515. However, if the first network access device 505 cannot decode the initial PUSCH transmission transmitted at 515, the first network access device 505 will not transmit a contention resolution message at 545, and the contention resolution timer started by the UE 515 may expire, thereby causing the UE 515 to initiate another RACH procedure.

Figure 6:
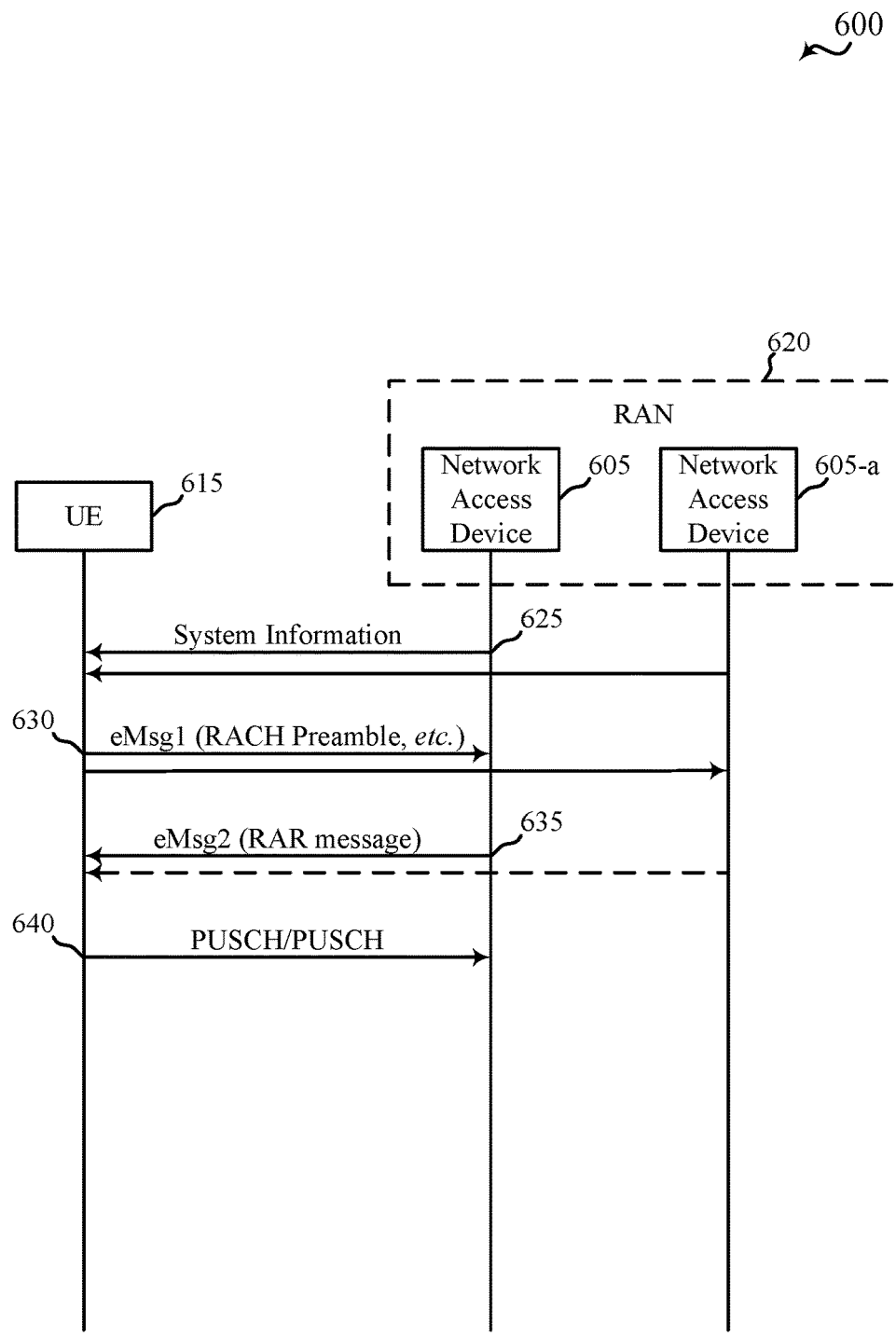
FIG. 6 shows a message flow between a UE and a RAN during performance of a two-step RACH procedure, in accordance with one or more aspects of the present disclosure.

FIG. 6 shows a message flow 600 between a UE 615 and a RAN 620 during performance of a two-step RACH procedure, in accordance with one or more aspects of the present disclosure. The UE 615 may be an example of aspects of the UEs 115 or 515 described with reference to FIG. 1 or 5. The RAN 620 may include a first network access device 605 or a second network access device 605-*a*, both of which may be examples of aspects of the network access devices 105 or 505 described with reference to FIG. 1 or 5. In some examples, the first network access device 605 and second network access device 605-*a* may be different gNBs or different smart radio heads.

The message flow 600 includes two messages, including a first message (eMsg1) transmitted by the UE 615 to the RAN 620 at 630, and a second message (eMsg2) transmitted by the first network access device 605 to the UE 615 at 635.

At 625, prior to the RACH procedure, one or more network access devices of the RAN 620 (e.g., the first network access device 605 and the second network access device 605-*a*) may broadcast system information. The system information may include, for example, an indication of at least one receive capability of the network access device. In a next generation, 5G, or NR network, the at least one receive capability may include just a CP-OFDM waveform receive capability, or both a DFT-s-OFDM receive capability and a CP-OFDM waveform receive capability. The system information may be broadcast by the first network access device 605 and the second network access device 605-*a* synchronously or asynchronously, at the same or different times. In some examples, the system information may be broadcast in a MIB or a MSIB. A MIB may be transmitted on a PBCH. A MSIB may be transmitted on a PDSCH. In some examples, each of the network access devices 605 and 605-*a* may transmit a MIB and a MSIB, with the MIB being transmitted more frequently than the MSIB. By way of example, the network access devices 605 and 605-*a* may be radio heads associated with a common ANC (e.g., radio heads of a gNB).

At 630, a message (eMsg1) including a RACH preamble and other parameters or information may be transmitted on a PRACH (or ePRACH) of an uplink. In some examples, the RACH preamble may be selected from a plurality of preamble sequences with a cell. The UE 615 may identify the plurality of preamble sequences from system information broadcast by the network access devices 605 and 605-*a* of the RAN 620 (e.g., from the system information broadcast at 625). The other parameters or information included in the eMsg1 may include, for example, a RACH message (e.g., a RRC Connection Request message) including an identifier of the UE 615 (i.e., a UE identifier) and other signaling information (e.g., a buffer status report (BSR) or SR). In some examples, such as when the RACH procedure is performed during an initial access or as the UE 615 transitions to a RRC Connected Mode state, the UE 615 may transmit the message at 630 in accordance with a predetermined uplink resource assignment (e.g., a CP-OFDM waveform resource assignment or a DFT-s-OFDM waveform assignment, as indicated in a standard or specification). In other examples, the first message may be transmitted according to an uplink resource assignment identified to the UE 615 by a serving network access device. For example, when the UE 615 is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the UE 615). In some examples, the message transmitted at 630 may be received by the first network access device 605 or the second network access device 605-a.

At 635, and in response to detecting the RACH preamble transmitted at 630, the first network access device 605 may transmit a RAR message (eMsg2). In some examples, the RAR message may be transmitted on a PDCCH and/or a PDSCH. The RAR message may include, for example, an identifier (ID) of the detected RACH preamble, a contention resolution message, timing advance (TA) information, a downlink grant (e.g., for a PDSCH), an uplink grant (e.g., a grant of transmission resources on a PUSCH), a transmit power control (TPC) command, a backoff indicator (e.g., an indicator of how long the UE 615 should wait before performing another RACH procedure when contention for resources prevents the UE 615 from completing the RACH procedure initiated at 630), and/or other information or parameters. If the first network access device 605 does not detect the RACH preamble transmitted at 630, the first network access device 605 will not transmit a RAR message at 635. Upon detecting (or not detecting) the RACH preamble transmitted at 630, the second network access device 605-a may also transmit (or not transmit) a RAR message to the UE 615.

Upon receiving a RAR message transmitted at 635, the UE 615 may demodulate the RAR message.

At 640, the UE 615 may transmit a PUSCH and/or a (physical uplink control channel (PUCCH) using the transmission resources associated with the uplink grant included in the RAR message transmitted at 635.

Depending on the receive capability (or capabilities) of the first network access device 505 or 605 described with reference to FIG. 5 or 6, the first network access device 505 or 605 may transmit a RAR message in one of a number of formats, and the UE 515 or 615 may interpret the RAR message in accordance with the RAR message format used by the network access device 505 or 605. For example, when the system information broadcast at 525 or 625 indicates that the first network access device 505 or 605 only has a CP-OFDM waveform receive capability (or that the first network access device 505 or 605 does not support a DFT-s-OFDM waveform receive capability), the first network access device 505 or 605 may transmit the RAR message (at 535 or 635) in accordance with a RAR format 1 and include, in the RAR message, a CP-OFDM waveform resource assignment (e.g., for transmission of a third message of the RACH procedure (e.g., a Msg3 of a four-step RACH procedure transmitted on a PUSCH) or a PUSCH or a PUCCH (e.g., a PUSCH or a PUCCH transmitted following a two-step RACH procedure).

When the system information broadcast at 525 or 625 indicates that the first network access device 505 or 605 has a CP-OFDM waveform receive capability and a DFT-s-OFDM waveform receive capability, the first network access device 505 or 605 may transmit the RAR message (at 535 or 635) in accordance with a RAR format 2 and include, in the RAR message, an indication of a type of uplink resource assignment included in the RAR message and the indicated type of uplink resource assignment. The type of uplink resource assignment may be selected by the first network access device 505 or 605, and in some examples may include a CP-OFDM waveform resource assignment or a DFT-s-OFDM waveform resource assignment. The indicated type of uplink resource assignment may be used, by the UE 515 or 615, to transmit a third message of the RACH procedure (e.g., a Msg3 of a four-step RACH procedure transmitted on a PUSCH) or a PUSCH or a PUCCH (e.g., a PUSCH or a PUCCH transmitted following a two-step RACH procedure). In some examples, the type of uplink resource assignment may be indicated using one bit, such as a bit that is set to "0" for a CP-OFDM waveform resource assignment, or to "1" for a DFT-s-OFDM waveform resource assignment.

Figure 7:
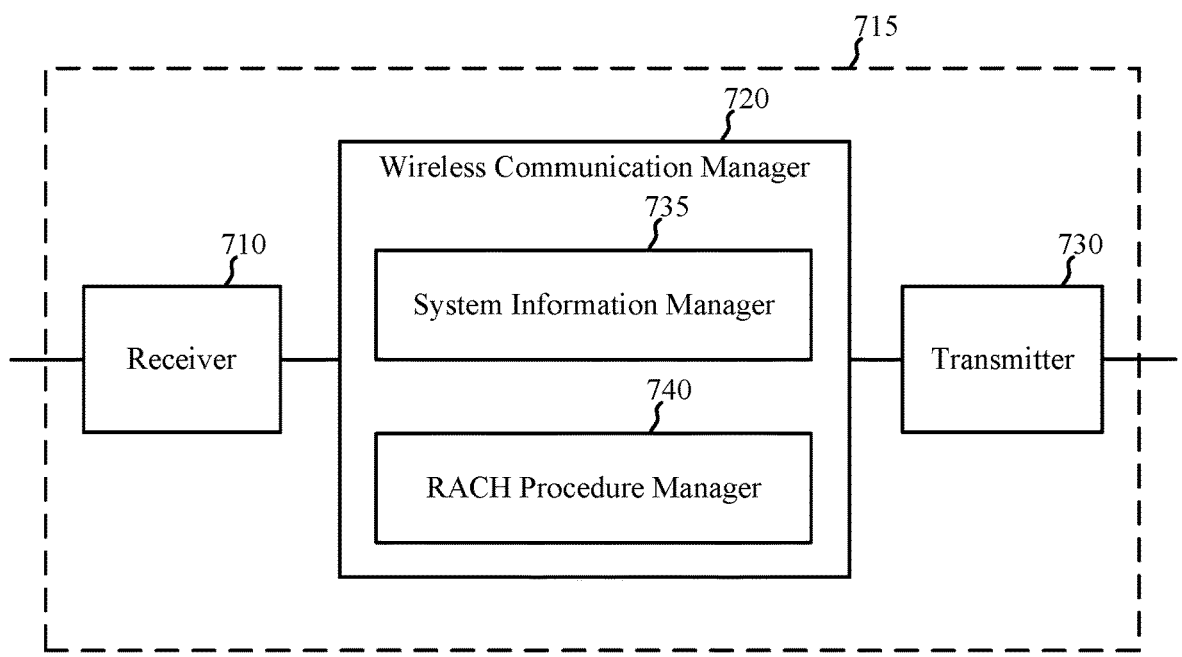
FIG. 7 shows a block diagram of an apparatus for use in wireless communication, in accordance with one or more aspects of the present disclosure.

FIG. 7 shows a block diagram 700 of an apparatus 715 for use in wireless communication, in accordance with one or more aspects of the present disclosure. The apparatus 715 may be an example of aspects of one or more of the UEs described with reference to FIG. 1, 5, or 6. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over one or more radio frequency spectrum bands. In some examples, the one or more radio frequency spectrum bands may be used for communicating as described with reference to FIG. 1, 2, 3, 4, 5, or 6. The receiver 710 may be used to receive various types of data or control signals (i.e., transmissions) over one or more communication links of a wireless communication system, such as one or more communication links of the wireless communication system 100 described with reference to FIG. 1.

In some examples, the transmitter 730 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, 5, or 6. The transmitter 730 may be used to transmit various types of data or control signals (i.e., transmissions) over one or more communication links of a wireless communication system, such as one or more communication links of the wireless communication system 100 described with reference to FIG. 1.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include a system information manager 735 or a RACH procedure manager 740.

The system information manager 735 may be used to receive an indication of at least one receive capability of a network access device (e.g., a smart radio head, ANC, or gNB). In some examples, the indication of the at least one receive capability of the network access device may be received in system information. In some examples, the system information may be received in at least one of a MIB received on a PBCH, or a MSIB received on a PDSCH, or a combination thereof.

The RACH procedure manager 740 may be used to transmit a first message of a RACH procedure. In some examples, such as when the RACH procedure is performed during an initial access or as the apparatus 715 transitions to a RRC Connected Mode state, the first message may be transmitted according to a predetermined uplink resource assignment. The predetermined uplink resource assignment may include, for example, a CP-OFDM waveform resource assignment or a DFT-s-OFDM waveform resource assignment. In other examples, the first message may be transmitted according to an uplink resource assignment identified to the UE by a serving network access device. For example, when the UE is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the wireless communication manager 720).

The RACH procedure manager 740 may also be used to receive a RAR message in response to transmitting the first message, and to interpret the RAR message according to a format based at least in part on the received indication.

Figure 8:
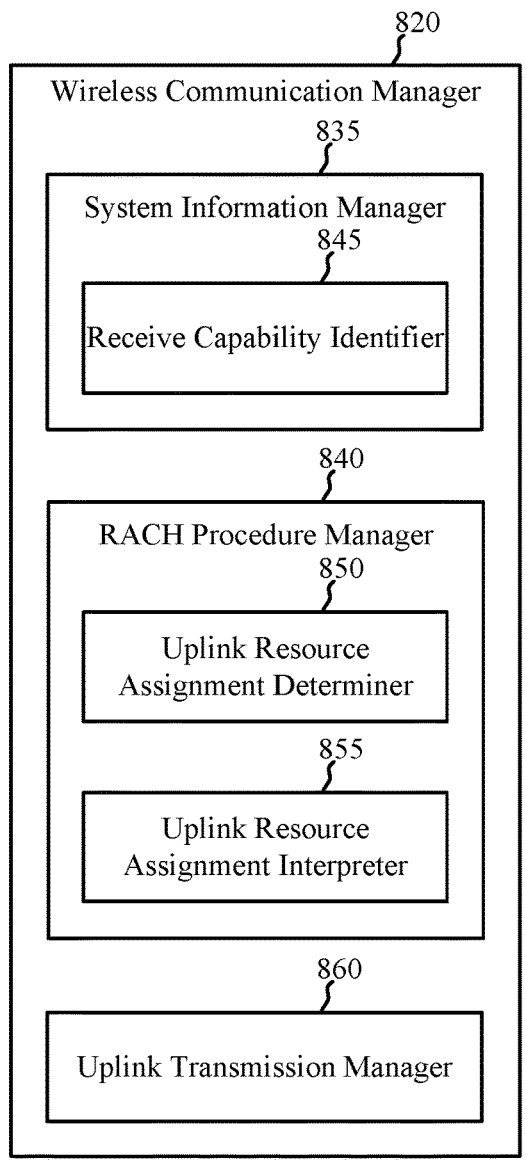
FIG. 8 shows a block diagram of a wireless communication manager for use in wireless communication, in accordance with one or more aspects of the present disclosure.

FIG. 8 shows a block diagram 800 of a wireless communication manager 820 for use in wireless communication, in accordance with one or more aspects of the present disclosure. The wireless communication manager 820 may be an example of aspects of the wireless communication manager described with reference to FIG. 7.

The components of the wireless communication manager 820 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 820 may be used to manage one or more aspects of wireless communication for a UE or apparatus, such as one of the UEs or apparatuses described with reference to FIG. 1, 5, 6, or 7. In some examples, part of the wireless communication manager 820 may be incorporated into or shared with a receiver or a transmitter (e.g., the receiver 710 or the transmitter 730 described with reference to FIG. 7). In some examples, the wireless communication manager 820 may include a system information manager 835, a RACH procedure manager 840, or an uplink transmission manager 860. The system information manager 835 may include a receive capability identifier 845. The RACH procedure manager 840 may include an uplink resource assignment determiner 850 or an uplink resource assignment interpreter 855.

The system information manager 835 may be used to receive an indication of at least one receive capability of a network access device (e.g., a smart radio head, ANC, or gNB). In some examples, the indication of the at least one receive capability of the network access device may be received in system information. In some examples, the system information may be received in at least one of a MIB received on a PBCH, or a MSIB received on a PDSCH, or a combination thereof.

The receive capability identifier 845 may be used to identify, based at least in part on the indication received using the system information manager 835, the at least one receive capability of the network access device. In some examples, the at least one receive capability may only include a CP-OFDM waveform receive capability. In other examples, the at least one receive capability may include a CP-OFDM waveform receive capability and a DFT-s-OFDM waveform receive capability.

The RACH procedure manager 840 may be used to transmit a first message of a RACH procedure. In some examples, such as when the RACH procedure is performed during an initial access or as an apparatus including the wireless communication manager 820 transitions to a RRC Connected Mode state, the first message may be transmitted according to a predetermined uplink resource assignment. The predetermined uplink resource assignment may include, for example, a CP-OFDM waveform resource assignment or a DFT-s-OFDM waveform resource assignment. In other examples, the first message may be transmitted according to an uplink resource assignment identified to the UE by a serving network access device. For example, when the UE is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the wireless communication manager 820).

The RACH procedure manager 840 may also be used to receive a RAR message in response to transmitting the first message, and to interpret the RAR message according to a format based at least in part on the received indication. When the at least one receive capability of the network access device only includes a CP-OFDM waveform receive capability, the uplink resource assignment interpreter 855 of the RACH procedure manager 740 may be used to interpret an uplink resource assignment included in the RAR message as a CP-OFDM waveform resource assignment. When the at least one receive capability of the network access device includes a CP-OFDM waveform receive capability and a DFT-s-OFDM waveform receive capability, the uplink resource assignment determiner 850 may be used to determine a type of uplink resource assignment included in the RAR message based at least in part on a second indication included in the RAR message, and the uplink resource assignment interpreter 855 may be used to interpret an uplink resource assignment included in the RAR message as the determined type of uplink resource assignment. In some examples, the determined type of uplink resource assignment may include a CP-OFDM waveform resource assignment or a DFT-s-OFDM waveform resource assignment.

The uplink transmission manager 860 may be used to transmit, based at least in part on the uplink resource assignment included in the RAR message, at least one of a third message of the RACH procedure (e.g., a Msg3 of a four-step RACH procedure transmitted on a PUSCH), or a PUSCH or a PUCCH (e.g., a PUSCH or a PUCCH transmitted following a two-step RACH procedure), or a combination thereof.

Figure 9:
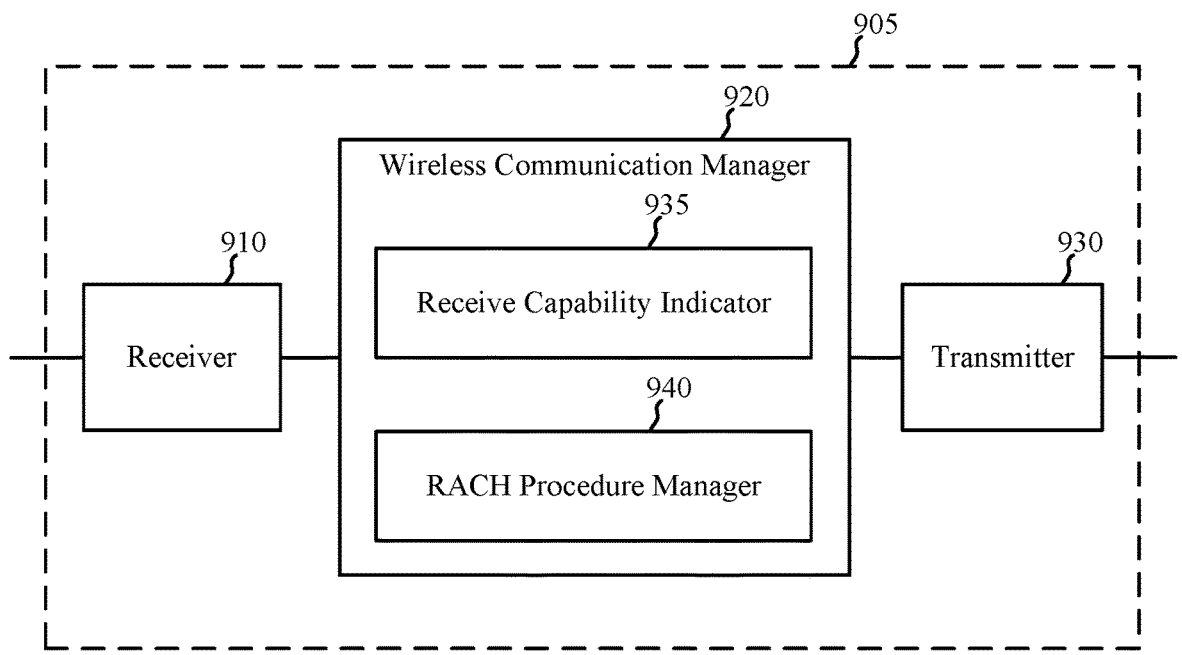
FIG. 9 shows a block diagram of an apparatus for use in wireless communication, in accordance with one or more aspects of the present disclosure.

FIG. 9 shows a block diagram 900 of an apparatus 905 for use in wireless communication, in accordance with one or more aspects of the present disclosure. The apparatus 905 may be an example of aspects of one or more of the network access devices (e.g., a smart radio head, ANC, or gNB) described with reference to FIG. 1, 5, or 6. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over one or more radio frequency spectrum bands. In some examples, the one or more radio frequency spectrum bands may be used for communicating as described with reference to FIG. 1, 2, 3, 4, 5, or 6. The receiver 910 may be used to receive various types of data or control signals (i.e., transmissions) over one or more communication links of a wireless communication system, such as one or more communication links of the wireless communication system 100 described with reference to FIG. 1.

In some examples, the transmitter 930 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, 4, 5, or 6. The transmitter 930 may be used to transmit various types of data or control signals (i.e., transmissions) over one or more communication links of a wireless communication system, such as one or more communication links of the wireless communication system 100 described with reference to FIG. 1.

In some examples, the wireless communication manager 920 may be used to manage one or more aspects of wireless communication for the apparatus 905. In some examples, part of the wireless communication manager 920 may be incorporated into or shared with the receiver 910 or the transmitter 930. In some examples, the wireless communication manager 920 may include a receive capability indicator 935 or a RACH procedure manager 940.

The receive capability indicator 935 may be used to transmit an indication of at least one receive capability of the apparatus 905. In some examples, the indication of the at least one receive capability of the apparatus 905 may be transmitted in system information. In some examples, the system information may be transmitted in at least one of a MIB transmitted on a PBCH, or a MSIB transmitted on a PDSCH, or a combination thereof.

The RACH procedure manager 940 may be used to receive, from a UE, a first message of a RACH procedure. In some examples, such as when the RACH procedure is performed during an initial access or as the UE transitions to a RRC Connected Mode state, the first message may be received according to a predetermined uplink resource assignment. The predetermined uplink resource assignment may include, for example, a CP-OFDM waveform resource assignment or a DFT-s-OFDM waveform resource assignment. In other examples, the first message may be received according to an uplink resource assignment identified to the UE by the apparatus 905. For example, when the UE is in a Connected Mode (e.g., the RRC_ACTIVE state 405 described with reference to FIG. 4) and performs a RACH procedure in conjunction with a handover from the apparatus 905 (i.e., a source network access device or serving network access device) to a target network access device, the uplink resource assignment for the first message may be identified (e.g., by the apparatus 905) in conjunction with the handover (e.g., in a HO command transmitted to the UE).

The RACH procedure manager 940 may also be used to transmit a RAR message, to the UE, in response to receiving the first message. The RAR message may have a format based at least in part on the at least one receive capability of the apparatus 905.

Figure 10:
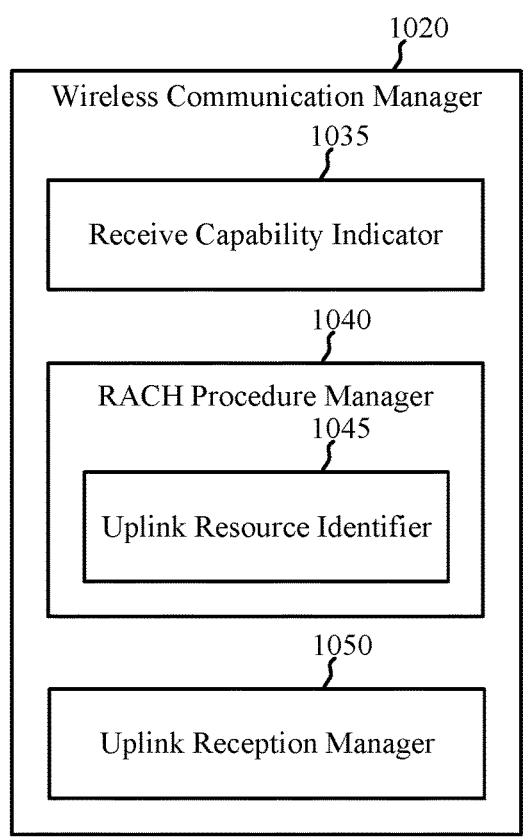
FIG. 10 shows a block diagram of a wireless communication manager for use in wireless communication, in accordance with one or more aspects of the present disclosure.

FIG. 10 shows a block diagram 1000 of a wireless communication manager 1020 for use in wireless communication, in accordance with one or more aspects of the present disclosure. The wireless communication manager 1020 may be an example of aspects of the wireless communication manager described with reference to FIG. 9.

The components of the wireless communication manager 1020 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 1020 may be used to manage one or more aspects of wireless communication for a UE or apparatus, such as one of the UEs or apparatuses described with reference to FIG. 1, 5, 6, or 9. In some examples, part of the wireless communication manager 1020 may be incorporated into or shared with a receiver or a transmitter (e.g., the receiver 910 or the transmitter 930 described with reference to FIG. 9). In some examples, the wireless communication manager 1020 may include a receive capability indicator 1035, a RACH procedure manager 1040, or an uplink reception manager 1050. The RACH procedure manager 1040 may include an uplink resource identifier 1045.

The receive capability indicator 1035 may be used to transmit an indication of at least one receive capability of an apparatus including the wireless communication manager 1020. In some examples, the at least one receive capability may include only a CP-OFDM waveform receive capability. In other examples, the at least one receive capability may include a CP-OFDM waveform receive capability and a DFT-s-OFDM waveform receive capability. In some examples, the indication of the at least one receive capability may be transmitted in system information. In some examples, the system information may be transmitted in at least one of a MIB transmitted on a PBCH, or a MSIB transmitted on a PDSCH, or a combination thereof.

The RACH procedure manager 1040 may be used to receive, from a UE, a first message of a RACH procedure. In some examples, such as when the RACH procedure is performed during an initial access or as the UE transitions to a RRC Connected Mode state, the first message may be received according to a predetermined uplink resource assignment. The predetermined uplink resource assignment may include, for example, a CP-OFDM waveform resource assignment or a DFT-s-OFDM waveform resource assignment. In other examples, the first message may be received according to an uplink resource assignment identified to the UE by the receive capability indicator 1035. For example, when the UE is in a Connected Mode (e.g., the RRC_ACTIVE state 405 described with reference to FIG. 4) and performs a RACH procedure in conjunction with a handover from an apparatus including the wireless communication manager 1020 (i.e., a source network access device or serving network access device) to a target network access device, the uplink resource assignment for the first message may be identified (e.g., by the apparatus including the wireless communication manager 1020) in conjunction with the handover (e.g., in a HO command transmitted to the UE).

The RACH procedure manager 1040 may also be used to transmit a RAR message, to the UE, in response to receiving the first message. The RAR message may have a format based at least in part on the at least one receive capability indicated by the receive capability indicator 1035. When the at least one receive capability of the apparatus including the wireless communication manager 1020 only includes a CP-OFDM waveform receive capability, and in some examples, the format of the RAR message may include a CP-OFDM waveform resource assignment. When the at least one receive capability of the apparatus including the wireless communication manager 1020 includes a CP-OFDM waveform receive capability and a DFT-s-OFDM waveform receive capability, the uplink resource identifier 1045 may identify a type of uplink resource assignment included in a RAR message, and the format of the RAR message may include the identified type of uplink resource assignment. The type of uplink resource assignment may be identified using a second indication included in the RAR message. In some examples, the identified type of uplink resource assignment may include a CP-OFDM waveform resource assignment or a DFT-s-OFDM waveform resource assignment.

The RACH procedure manager 1040 may be used to receive, based at least in part on the CP-OFDM waveform resource assignment (e.g., when the at least one receive capability only includes a CP-OFDM waveform receive capability) or the type of uplink resource assignment identified in the RAR message (e.g., when the at least one receive capability includes a CP-OFDM waveform receive capability and a DFT-s-OFDM waveform receive capability), a third message of the RACH procedure (e.g., a Msg3 of a four-step RACH procedure transmitted on a PUSCH).

The uplink reception manager 1050 may be used to receive, based at least in part on the CP-OFDM waveform resource assignment (e.g., when the at least one receive capability only includes a CP-OFDM waveform receive capability) or the type of uplink resource assignment identified in the RAR message (e.g., when the at least one receive capability includes a CP-OFDM waveform receive capability and a DFT-s-OFDM waveform receive capability), a PUSCH or a PUCCH (e.g., a PUSCH or a PUCCH transmitted following a two-step RACH procedure).

Figure 11:
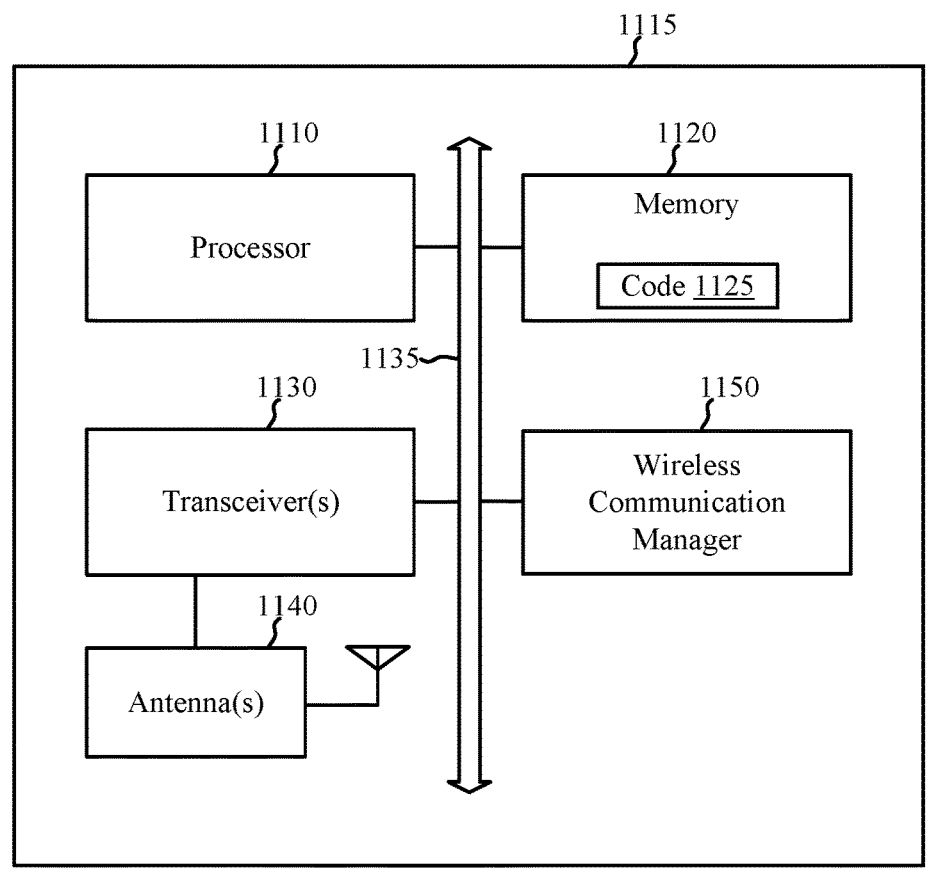
FIG. 11 shows a block diagram of a UE for use in wireless communication, in accordance with one or more aspects of the present disclosure.

FIG. 11 shows a block diagram 1100 of a UE 1115 for use in wireless communication, in accordance with one or more aspects of the present disclosure. The UE 1115 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1115 may, in some examples, have an internal power supply (not shown), such as a small battery, to facilitate mobile operation. In some examples, the UE 1115 may be an example of aspects of one or more of the UEs described with reference to FIG. 1, 5, or 6, or aspects of the apparatus 715 described with reference to FIG. 7. The UE 1115 may be configured to implement at least some of the UE or apparatus techniques and functions described with reference to FIG. 1, 2, 3, 4, 5, 6, 7, or 8.

The UE 1115 may include a processor 1110, a memory 1120, at least one transceiver (represented by transceiver(s) 1130), at least one antenna (represented by antenna(s) 1140), or a wireless communication manager 1150. Each of these components may be in communication with each other, directly or indirectly, over one or more buses 1135.

The memory 1120 may include random access memory (RAM) or read-only memory (ROM). The memory 1120 may store computer-readable, computer-executable code 1125 containing instructions that are configured to, when executed, cause the processor 1110 to perform various functions described herein related to wireless communication, including, for example, performing a RACH procedure using one or more waveforms (e.g., a CP-OFDM waveform and/or a DFT-s-OFDM waveform). Alternatively, the computer-executable code 1125 may not be directly executable by the processor 1110 but be configured to cause the UE 1115 (e.g., when compiled and executed) to perform various of the functions described herein.

The processor 1110 may include an intelligent hardware device, e.g., a central processing unit (CPU), a microcontroller, an ASIC, etc. The processor 1110 may process information received through the transceiver(s) 1130 or information to be sent to the transceiver(s) 1130 for transmission through the antenna(s) 1140. The processor 1110 may handle, alone or in connection with the wireless communication manager 1150, one or more aspects of communicating over (or managing communications over) one or more radio frequency spectrum bands.

The transceiver(s) 1130 may include a modem configured to modulate packets and provide the modulated packets to the antenna(s) 1140 for transmission, and to demodulate packets received from the antenna(s) 1140. The transceiver(s) 1130 may, in some examples, be implemented as one or more transmitters and one or more separate receivers. The transceiver(s) 1130 may support communications in one or more radio frequency spectrum bands. The transceiver(s) 1130 may be configured to communicate bi-directionally, via the antenna(s) 1140, with one or more of the network access devices described with reference to FIG. 1, 5, or 6, or the apparatus 905 described with reference to FIG. 9.

The wireless communication manager 1150 may be configured to perform or control some or all of the UE or apparatus techniques or functions described with reference to FIG. 1, 2, 3, 4, 5, 6, 7, or 8 related to wireless communication. The wireless communication manager 1150, or portions of it, may include a processor, or some or all of the functions of the wireless communication manager 1150 may be performed by the processor 1110 or in connection with the processor 1110. In some examples, the wireless communication manager 1150 may be an example of aspects of the wireless communication managers described with reference to FIG. 1, 7, or 8.

Figure 12:
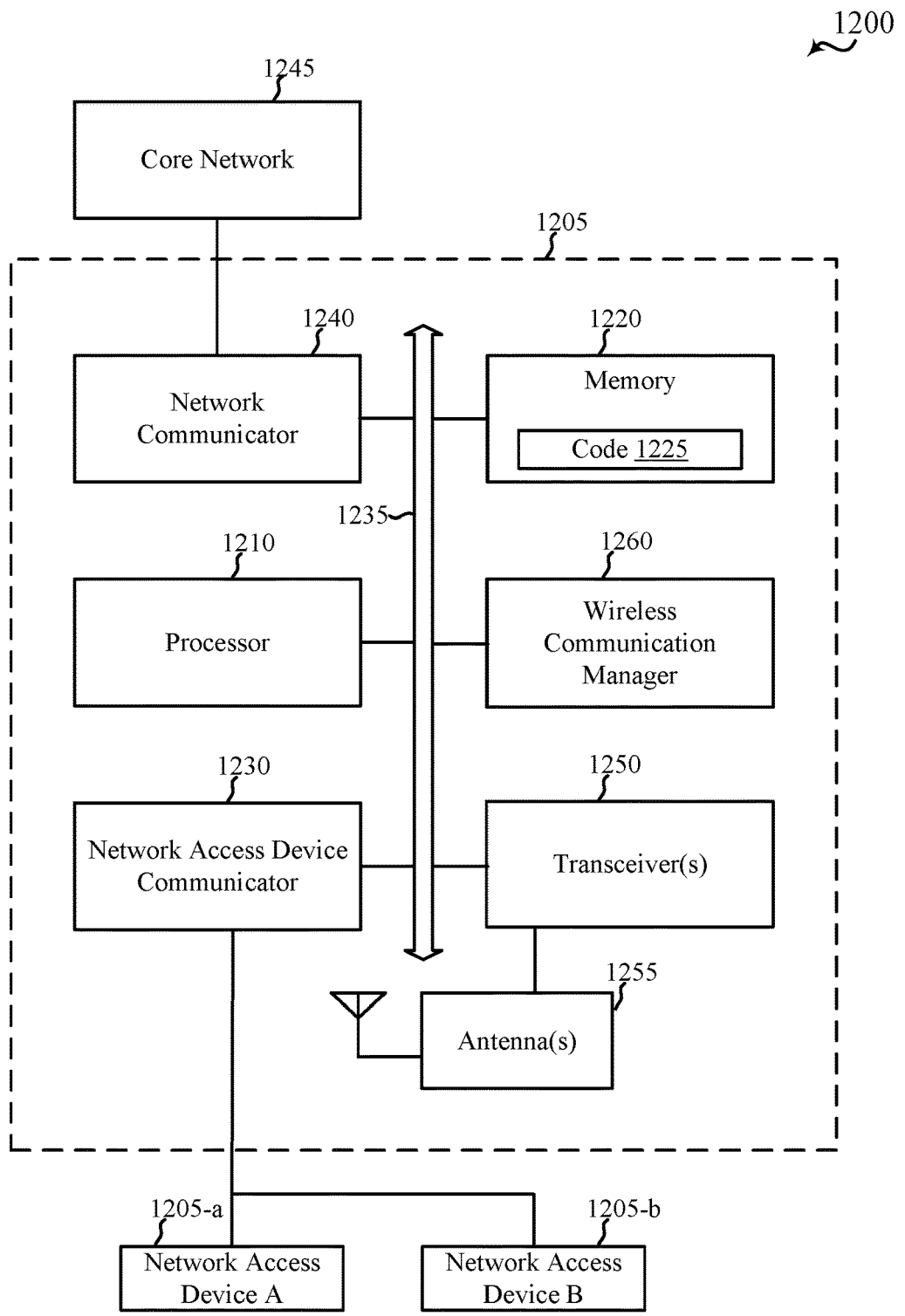
FIG. 12 shows a block diagram of a network access device for use in wireless communication, in accordance with one or more aspects of the present disclosure.

FIG. 12 shows a block diagram 1200 of a network access device 1205 for use in wireless communication, in accordance with one or more aspects of the present disclosure. In some examples, the network access device 1205 may be an example of one or more aspects of the network access devices (e.g., a smart radio head, ANC, or gNB) described with reference to FIG. 1, 5, or 6, or aspects of the apparatus 905 described with reference to FIG. 9. The network access device 1205 may be configured to implement or facilitate at least some of the network access device techniques and functions described with reference to FIG. 1, 2, 3, 4, 7, or 8.

The network access device 1205 may include a processor 1210, a memory 1220, at least one transceiver (represented by transceiver(s) 1250), at least one antenna (represented by antenna(s) 1255), or a wireless communication manager 1260. The network access device 1205 may also include one or more of a network access device communicator 1230 or a network communicator 1240. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor 1210 to perform various functions described herein related to wireless communication, including, for example, facilitating a RACH procedure using one or more waveforms (e.g., a CP-OFDM waveform and/or a DFT-s-OFDM waveform). Alternatively, the computer-executable code 1225 may not be directly executable by the processor 1210 but be configured to cause the network access device 1205 (e.g., when compiled and executed) to perform various of the functions described herein.

The processor 1210 may include an intelligent hardware device, e.g., a CPU, a microcontroller, an ASIC, etc. The processor 1210 may process information received through the transceiver(s) 1250, the network access device communicator 1230, or the network communicator 1240. The processor 1210 may also process information to be sent to the transceiver(s) 1250 for transmission through the antenna(s) 1255, or to the network access device communicator 1230 for transmission to one or more other network access devices (e.g., network access device 1205-a or network access device 1205-b), or to the network communicator 1240 for transmission to a core network 1245, which may be an example of one or more aspects of the core network 130 described with reference to FIG. 1. The processor 1210 may handle, alone or in connection with the wireless communication manager 1260, one or more aspects of communicating over (or managing communications over) one or more radio frequency spectrum bands.

The transceiver(s) 1250 may include a modem configured to modulate packets and provide the modulated packets to the antenna(s) 1255 for transmission, and to demodulate packets received from the antenna(s) 1255. The transceiver(s) 1250 may, in some examples, be implemented as one or more transmitters and one or more separate receivers. The transceiver(s) 1250 may support communications in one or more radio frequency spectrum bands. The transceiver(s) 1250 may be configured to communicate bi-directionally, via the antenna(s) 1255, with one or more UEs or apparatuses, such as one of the UEs described with reference to FIG. 1, 5, 6, or 11, or the apparatus 715 described with reference to FIG. 7. The network access device 1205 may communicate with the core network 1245 through the network communicator 1240. The network access device 1205 may also communicate with other network access devices, such as the network access device 1205-a or the network access device 1205-b, using the network access device communicator 1230.

The wireless communication manager 1260 may be configured to perform or control some or all of the network access device or apparatus techniques or functions described with reference to FIG. 1, 2, 3, 4, 5, 6, 9, or 10 related to wireless communication. The wireless communication manager 1260, or portions of it, may include a processor, or some or all of the functions of the wireless communication manager 1260 may be performed by the processor 1210 or in connection with the processor 1210. In some examples, the wireless communication manager 1260 may be an example of aspects of the wireless communication managers described with reference to FIG. 1, 9, or 10.

In some examples, the components of the network access device 1205 may be distributed across an ANC and one or more smart radio heads. In these examples, aspects of the processor 1210, memory 1220, transceiver(s) 1250, antenna(s) 1255, or wireless communication manager 1260 may be implemented by and/or replicated in each of a number of smart radio heads, and the same or other aspects of the network access device 1205 may be implemented by an ANC.

Figure 13:
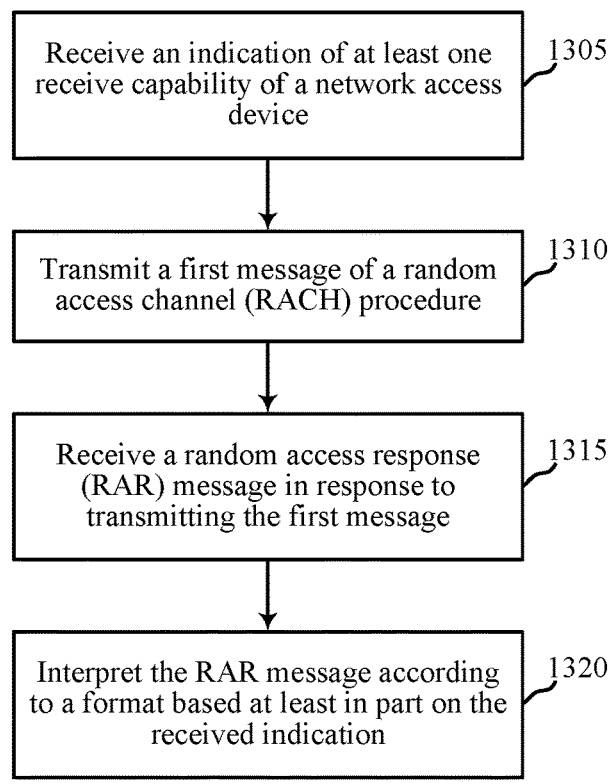
FIG. 13 is a flow chart illustrating an example of a method for wireless communication at a UE, in accordance with one or more aspects of the present disclosure.

FIG. 13 is a flow chart illustrating an example of a method 1300 for wireless communication at a UE, in accordance with one or more aspects of the present disclosure. For clarity, the method 1300 is described below with reference to aspects of one or more of the UEs described with reference to FIG. 1, 5, 6, or 11, aspects of the apparatus described with reference to FIG. 7, or aspects of one or more of the wireless communication managers described with reference to FIG. 1, 7, 8, or 11. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving an indication of at least one receive capability of a network access device (e.g., a smart radio head, ANC, or gNB). In some examples, the indication of the at least one receive capability of the network access device may be received in system information. In some examples, the system information may be received in at least one of a MIB received on a PBCH, or a MSIB received on a PDSCH, or a combination thereof. In certain examples, the operation(s) at block 1305 may be performed using the system information manager 735 or 835 described with reference to FIG. 7 or 8.

At block 1310, the method 1300 may include transmitting a first message of a RACH procedure. In some examples, such as when the RACH procedure is performed during an initial access or as the UE transitions to a RRC Connected Mode state, the first message may be transmitted according to a predetermined uplink resource assignment. The predetermined uplink resource assignment may include, for example, a CP-OFDM waveform resource assignment or a DFT-s-OFDM waveform resource assignment. In other examples, the first message may be transmitted according to an uplink resource assignment identified to the UE by a serving network access device. For example, when the UE is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the UE). In certain examples, the operation(s) at block 1310 may be performed using the RACH procedure manager 740 or 840 described with reference to FIG. 7 or 8.

At block 1315, the method 1300 may include receiving a RAR message in response to transmitting the first message. In certain examples, the operation(s) at block 1315 may be performed using the RACH procedure manager 740 or 840 described with reference to FIG. 7 or 8.

At block 1320, the method 1300 may include interpreting the RAR message according to a format based at least in part on the received indication. In certain examples, the operation(s) at block 1320 may be performed using the RACH procedure manager 740 or 840 described with reference to FIG. 7 or 8.

Figure 14:
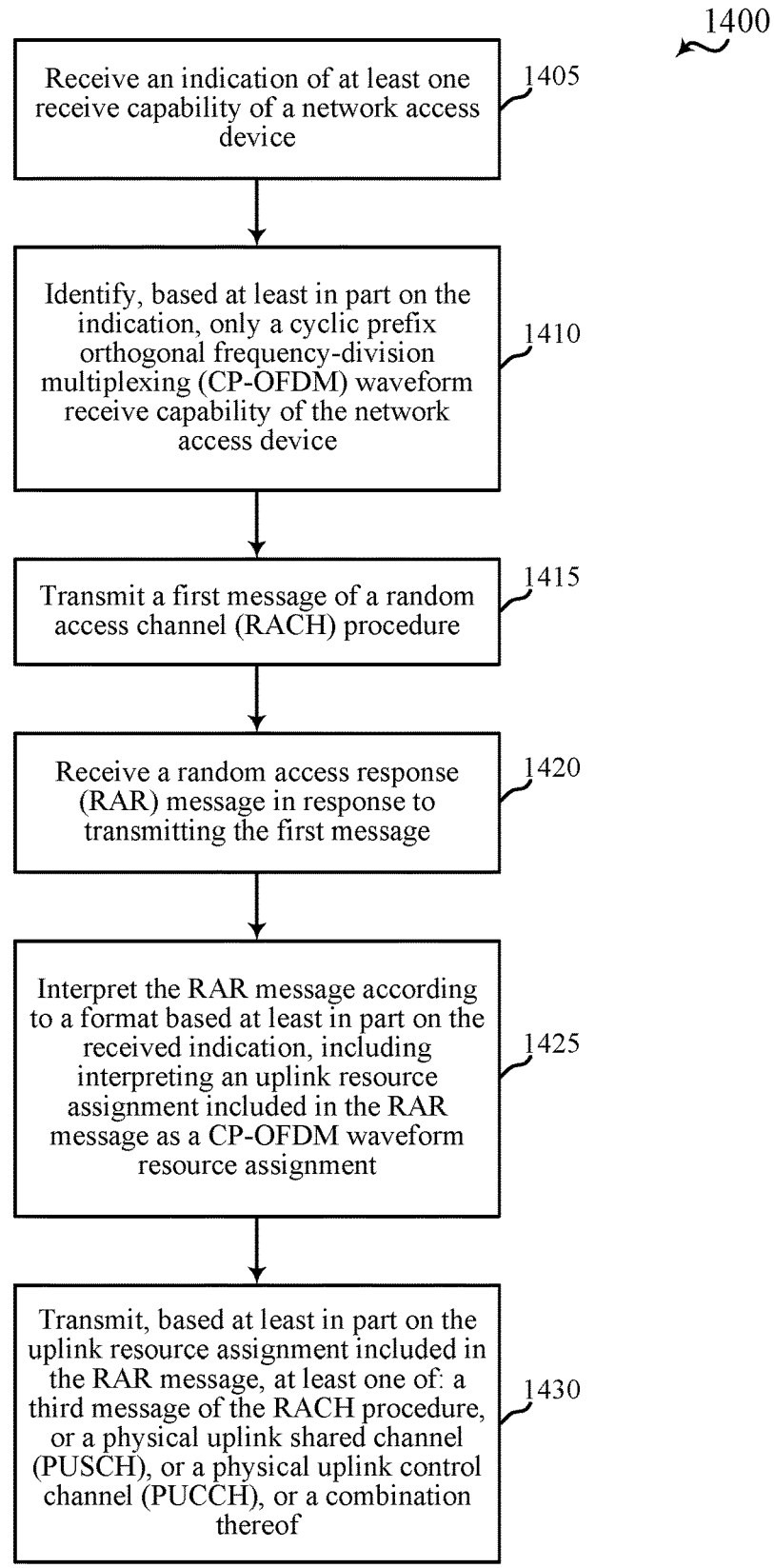
FIG. 14 is a flow chart illustrating an example of a method for wireless communication at a UE, in accordance with one or more aspects of the present disclosure.

FIG. 14 is a flow chart illustrating an example of a method 1400 for wireless communication at a UE, in accordance with one or more aspects of the present disclosure. For clarity, the method 1400 is described below with reference to aspects of one or more of the UEs described with reference to FIG. 1, 5, 6, or 11, aspects of the apparatus described with reference to FIG. 7, or aspects of one or more of the wireless communication managers described with reference to FIG. 1, 7, 8, or 11. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving an indication of at least one receive capability of a network access device (e.g., a smart radio head, ANC, or gNB). In some examples, the indication of the at least one receive capability of the network access device may be received in system information. In some examples, the system information may be received in at least one of a MIB received on a PBCH, or a MSIB received on a PDSCH, or a combination thereof. In certain examples, the operation(s) at block 1405 may be performed using the system information manager 735 or 835 described with reference to FIG. 7 or 8.

At block 1410, the method 1400 may include identifying, based at least in part on the indication, only a CP-OFDM waveform receive capability of the network access device. In certain examples, the operation(s) at block 1410 may be performed using the system information manager 735 or 835 described with reference to FIG. 7 or 8, or the receive capability identifier 845 described with reference to FIG. 8.

At block 1415, the method 1400 may include transmitting a first message of a RACH procedure. In some examples, such as when the RACH procedure is performed during an initial access or as the UE transitions to a RRC Connected Mode state, the first message may be transmitted according to a predetermined uplink resource assignment. The predetermined uplink resource assignment may include, for example, a CP-OFDM waveform resource assignment or a DFT-s-OFDM waveform resource assignment. In other examples, the first message may be transmitted according to an uplink resource assignment identified to the UE by a serving network access device. For example, when the UE is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the UE). In certain examples, the operation(s) at block 1415 may be performed using the RACH procedure manager 740 or 840 described with reference to FIG. 7 or 8.

At block 1420, the method 1400 may include receiving a RAR message in response to transmitting the first message. In certain examples, the operation(s) at block 1420 may be performed using the RACH procedure manager 740 or 840 described with reference to FIG. 7 or 8.

At block 1425, the method 1400 may include interpreting the RAR message according to a format based at least in part on the received indication. When the at least one receive capability of the network access device only includes a CP-OFDM waveform receive capability, the interpreting may include interpreting an uplink resource assignment included in the RAR message as a CP-OFDM waveform resource assignment. In certain examples, the operation(s) at block 1425 may be performed using the RACH procedure manager 740 or 840 described with reference to FIG. 7 or 8, or the uplink resource assignment interpreter 855 described with reference to FIG. 8.

At block 1430, the method 1400 may include transmitting, based at least in part on the uplink resource assignment included in the RAR message, at least one of a third message of the RACH procedure (e.g., a Msg3 of a four-step RACH procedure transmitted on a PUSCH), or a PUSCH or a PUCCH (e.g., a PUSCH or a PUCCH transmitted following a two-step RACH procedure), or a combination thereof. In certain examples, the operation(s) at block 1430 may be performed using the RACH procedure manager 740 or 840 described with reference to FIG. 7 or 8, or the uplink transmission manager 860 described with reference to FIG. 8.

Figure 15:
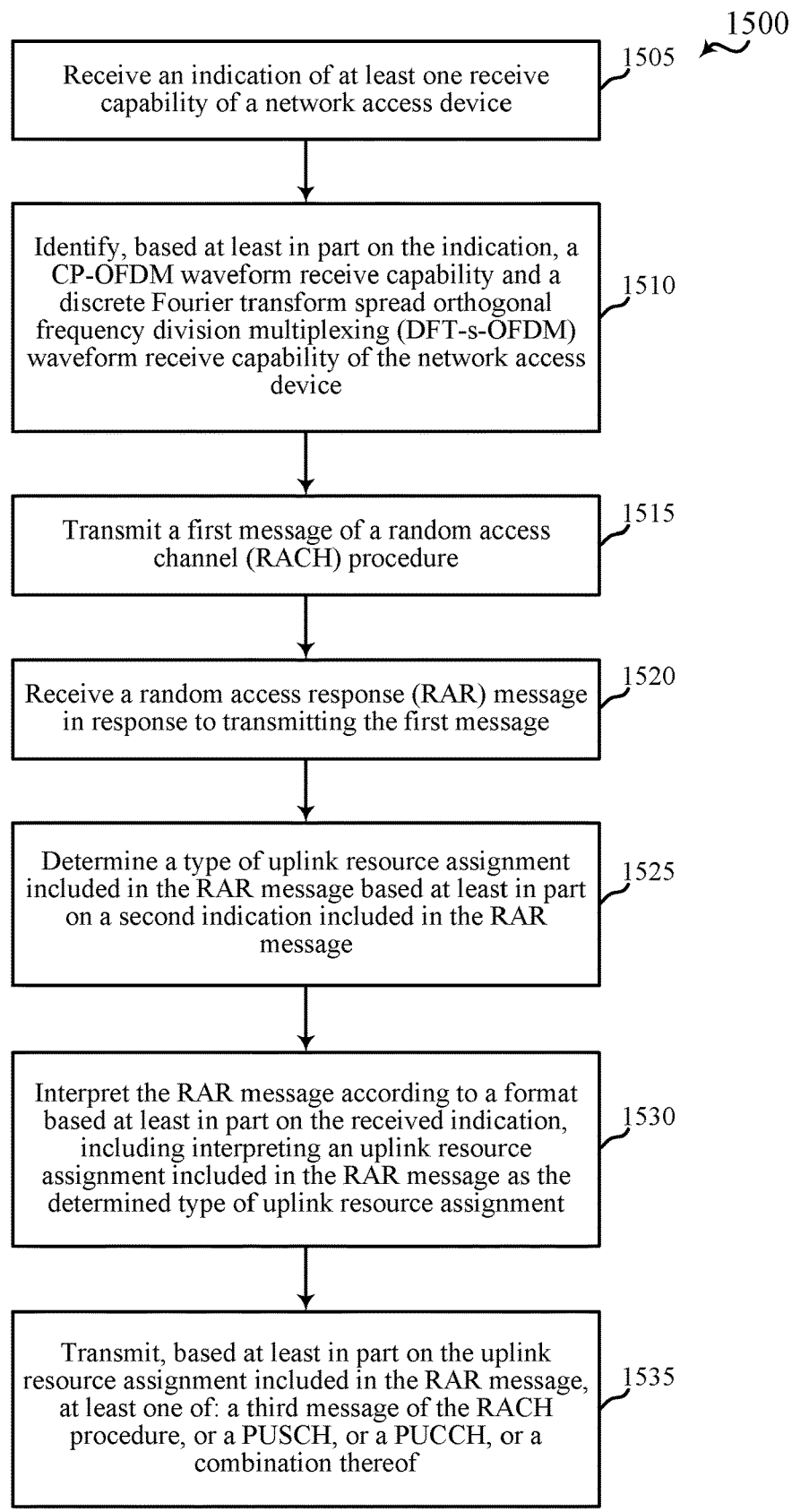
FIG. 15 is a flow chart illustrating an example of a method for wireless communication at a UE, in accordance with one or more aspects of the present disclosure.

FIG. 15 is a flow chart illustrating an example of a method 1500 for wireless communication at a UE, in accordance with one or more aspects of the present disclosure. For clarity, the method 1500 is described below with reference to aspects of one or more of the UEs described with reference to FIG. 1, 5, 6, or 11, aspects of the apparatus described with reference to FIG. 7, or aspects of one or more of the wireless communication managers described with reference to FIG. 1, 7, 8, or 11. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving an indication of at least one receive capability of a network access device (e.g., a smart radio head, ANC, or gNB). In some examples, the indication of the at least one receive capability of the network access device may be received in system information. In some examples, the system information may be received in at least one of a MIB received on a PBCH, or a MSIB received on a PDSCH, or a combination thereof. In certain examples, the operation(s) at block 1505 may be performed using the system information manager 735 or 835 described with reference to FIG. 7 or 8.

At block 1510, the method 1500 may include identifying, based at least in part on the indication, a CP-OFDM waveform receive capability and a DFT-s-OFDM waveform receive capability of the network access device. In certain examples, the operation(s) at block 1510 may be performed using the system information manager 735 or 835 described with reference to FIG. 7 or 8, or the receive capability identifier 845 described with reference to FIG. 8.

At block 1515, the method 1500 may include transmitting a first message of a RACH procedure. In some examples, such as when the RACH procedure is performed during an initial access or as the UE transitions to a RRC Connected Mode state, the first message may be transmitted according to a predetermined uplink resource assignment. The predetermined uplink resource assignment may include, for example, a CP-OFDM waveform resource assignment or a DFT-s-OFDM waveform resource assignment. In other examples, the first message may be transmitted according to an uplink resource assignment identified to the UE by a serving network access device. For example, when the UE is in a Connected Mode (e.g., the RRC_ACTIVE state 405 described with reference to FIG. 4) and performs a RACH procedure in conjunction with a handover from a source network access device (i.e., a serving network access device) to a target network access device, the uplink resource assignment for the first message may be identified by the source network access device in conjunction with the handover (e.g., in a HO command received by the UE). In certain examples, the operation(s) at block 1515 may be performed using the RACH procedure manager 740 or 840 described with reference to FIG. 7 or 8.

At block 1520, the method 1500 may include receiving a RAR message in response to transmitting the first message. In certain examples, the operation(s) at block 1520 may be performed using the RACH procedure manager 740 or 840 described with reference to FIG. 7 or 8.

At block 1525, the method 1500 may include determining a type of uplink resource assignment included in the RAR message based at least in part on a second indication included in the RAR message. When the at least one receive capability of the network access device includes a CP-OFDM waveform receive capability and a DFT-s-OFDM waveform receive capability, the determined type of uplink resource assignment may include a CP-OFDM waveform resource assignment or a DFT-s-OFDM waveform resource assignment. In certain examples, the operation(s) at block 1525 may be performed using the RACH procedure manager 740 or 840 described with reference to FIG. 7 or 8, or the uplink resource assignment determiner 850 described with reference to FIG. 7 or 8.

At block 1530, the method 1500 may include interpreting the RAR message according to a format based at least in part on the received indication. In some examples, the interpreting may include interpreting an uplink resource assignment included in the RAR message as the determined type of uplink resource assignment. In some examples, the determined type of uplink resource assignment may be a CP-OFDM waveform resource assignment or a DFT-s-OFDM waveform resource assignment. In certain examples, the operation(s) at block 1530 may be performed using the RACH procedure manager 740 or 840 described with reference to FIG. 7 or 8, or the uplink resource assignment interpreter 855 described with reference to FIG. 8.

At block 1535, the method 1500 may include transmitting, based at least in part on the uplink resource assignment included in the RAR message, at least one of a third message of the RACH procedure (e.g., a Msg3 of a four-step RACH procedure transmitted on a PUSCH), or a PUSCH or a PUCCH (e.g., a PUSCH or a PUCCH transmitted following a two-step RACH procedure), or a combination thereof. In certain examples, the operation(s) at block 1535 may be performed using the RACH procedure manager 740 or 840 described with reference to FIG. 7 or 8, or the uplink transmission manager 860 described with reference to FIG. 8.

Figure 16:
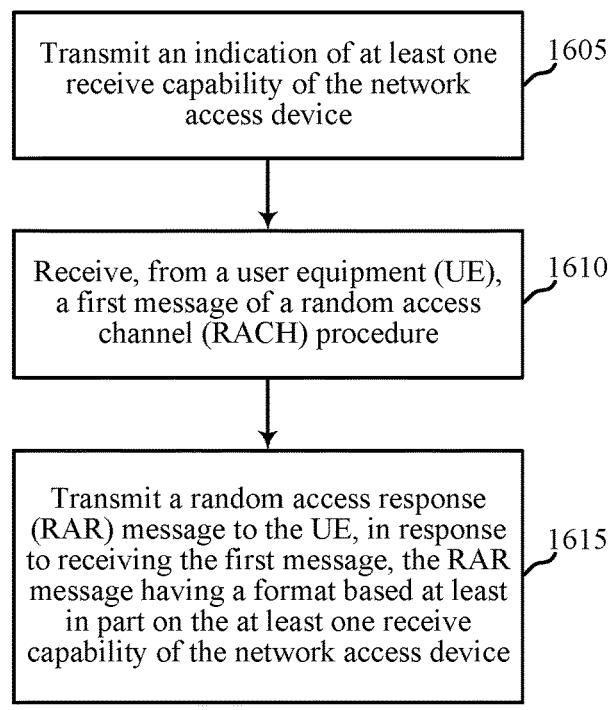
FIG. 16 is a flow chart illustrating an example of a method for wireless communication at a network access device (e.g., a smart radio head, active noise control (ANC), or next generation NodeB (gNB)), in accordance with one or more aspects of the present disclosure.

FIG. 16 is a flow chart illustrating an example of a method 1600 for wireless communication at a network access device (e.g., a smart radio head, ANC, or gNB), in accordance with one or more aspects of the present disclosure. For clarity, the method 1600 is described below with reference to aspects of one or more of the network access devices described with reference to FIG. 1, 5, 6, or 12, aspects of the apparatus described with reference to FIG. 9, or aspects of one or more of the wireless communication managers described with reference to FIG. 1, 9, 10, or 12. In some examples, a network access device may execute one or more sets of codes to control the functional elements of the network access device to perform the functions described below. Additionally or alternatively, the network access device may perform one or more of the functions described below using special-purpose hardware.

At block 1605, the method 1600 may include transmitting an indication of at least one receive capability of the network access device. In some examples, the indication of the at least one receive capability of the network access device may be transmitted in system information. In some examples, the system information may be transmitted in at least one of a MIB transmitted on a PBCH, or a MSIB transmitted on a PDSCH, or a combination thereof. In certain examples, the operation(s) at block 1605 may be performed using the receive capability indicator 935 or 1035 described with reference to FIG. 9 or 10.

At block 1610, the method 1600 may include receiving, from a UE, a first message of a RACH procedure. In some examples, such as when the RACH procedure is performed during an initial access or as the UE transitions to a RRC Connected Mode state, the first message may be received according to a predetermined uplink resource assignment. The predetermined uplink resource assignment may include, for example, a CP-OFDM waveform resource assignment or a DFT-s-OFDM waveform resource assignment. In other examples, the first message may be received according to an uplink resource assignment identified to the UE by the network access device. For example, when the UE is in a Connected Mode (e.g., the RRC_ACTIVE state 405 described with reference to FIG. 4) and performs a RACH procedure in conjunction with a handover from the network access device that is performing the method 1600 (i.e., a source network access device or serving network access device) to a target network access device, the uplink resource assignment for the first message may be identified (e.g., by the network access device that is performing the method 1600) in conjunction with the handover (e.g., in a HO command transmitted to the UE). In certain examples, the operation(s) at block 1610 may be performed using the RACH procedure manager 940 or 1040 described with reference to FIG. 9 or 10.

At block 1615, the method 1600 may include transmitting a RAR message to the UE, in response to receiving the first message. The RAR message may have a format based at least in part on the at least one receive capability of the network access device. In certain examples, the operation(s)

at block 1615 may be performed using the RACH procedure manager 940 or 1040 described with reference to FIG. 9 or 10.

Figure 17:
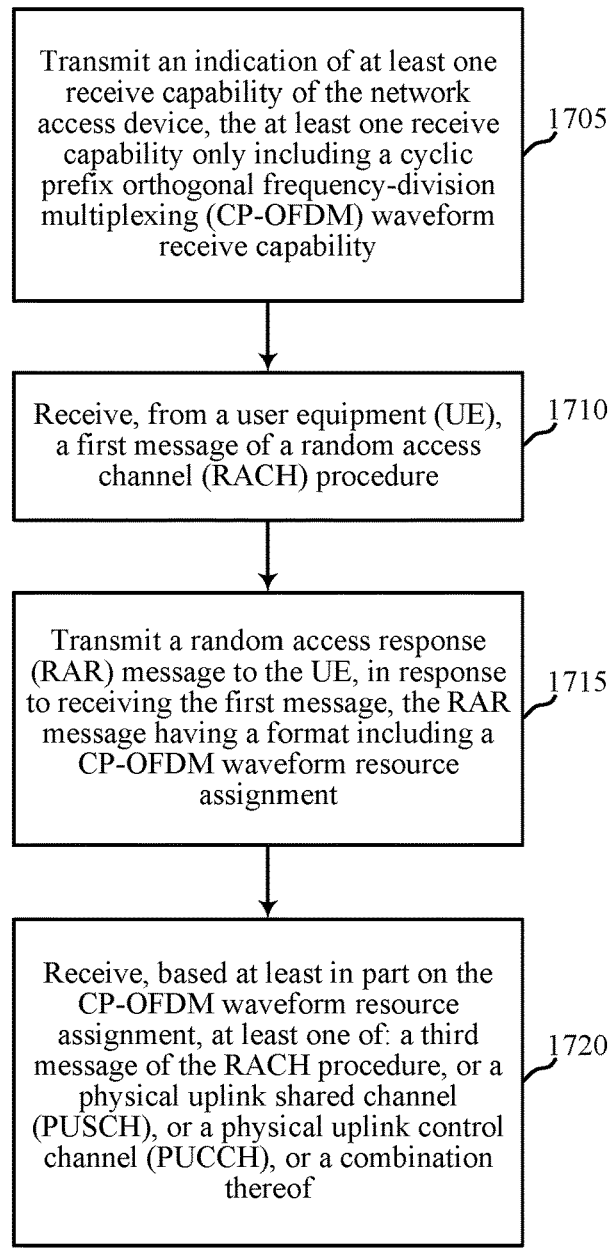
FIG. 17 is a flow chart illustrating an example of a method for wireless communication at a network access device (e.g., a smart radio head, ANC, or gNB), in accordance with one or more aspects of the present disclosure.

FIG. 17 is a flow chart illustrating an example of a method 1700 for wireless communication at a network access device (e.g., a smart radio head, ANC, or gNB), in accordance with one or more aspects of the present disclosure. For clarity, the method 1700 is described below with reference to aspects of one or more of the network access devices described with reference to FIG. 1, 5, 6, or 12, aspects of the apparatus described with reference to FIG. 9, or aspects of one or more of the wireless communication managers described with reference to FIG. 1, 9, 10, or 12. In some examples, a network access device may execute one or more sets of codes to control the functional elements of the network access device to perform the functions described below. Additionally or alternatively, the network access device may perform one or more of the functions described below using special-purpose hardware.

At block 1705, the method 1700 may include transmitting an indication of at least one receive capability of the network access device. By way of example, the at least one receive capability may only include a CP-OFDM waveform receive capability. In some examples, the indication of the at least one receive capability of the network access device may be transmitted in system information. In some examples, the system information may be transmitted in at least one of a MIB transmitted on a PBCH, or a MSIB transmitted on a PDSCH, or a combination thereof. In certain examples, the operation(s) at block 1705 may be performed using the receive capability indicator 935 or 1035 described with reference to FIG. 9 or 10.

At block 1710, the method 1700 may include receiving, from a UE, a first message of a RACH procedure. In some examples, such as when the RACH procedure is performed during an initial access or as the UE transitions to a RRC Connected Mode state, the first message may be received according to a predetermined uplink resource assignment. The predetermined uplink resource assignment may include, for example, a CP-OFDM waveform resource assignment or a DFT-s-OFDM waveform resource assignment. In other examples, the first message may be received according to an uplink resource assignment identified to the UE by the network access device. For example, when the UE is in a Connected Mode (e.g., the RRC_ACTIVE state 405 described with reference to FIG. 4) and performs a RACH procedure in conjunction with a handover from the network access device that is performing the method 1700 (i.e., a source network access device or serving network access device) to a target network access device, the uplink resource assignment for the first message may be identified (e.g., by the network access device that is performing the method 1700) in conjunction with the handover (e.g., in a HO command transmitted to the UE). In certain examples, the operation(s) at block 1710 may be performed using the RACH procedure manager 940 or 1040 described with reference to FIG. 9 or 10.

At block 1715, the method 1700 may include transmitting a RAR message, to the UE, in response to receiving the first message. The RAR message may have a format based at least in part on the at least one receive capability of the network access device. When the at least one receive capability only includes a CP-OFDM waveform receive capability, and in some examples, the format of the RAR message may include a CP-OFDM waveform resource assignment. In certain examples, the operation(s) at block 1715 may be performed using the RACH procedure manager 940 or 1040 described with reference to FIG. 9 or 10.

At block 1720, the method 1700 may include receiving, based at least in part on the CP-OFDM waveform resource assignment, at least one of a third message of the RACH procedure (e.g., a Msg3 of a four-step RACH procedure transmitted on a PUSCH), or a PUSCH or a PUCCH (e.g., a PUSCH or a PUCCH transmitted following a two-step RACH procedure), or a combination thereof. In certain examples, the operation(s) at block 1720 may be performed using the RACH procedure manager 940 or 1040 described with reference to FIG. 9 or 10, or the uplink reception manager 1050 described with reference to FIG. 10.

Figure 18:
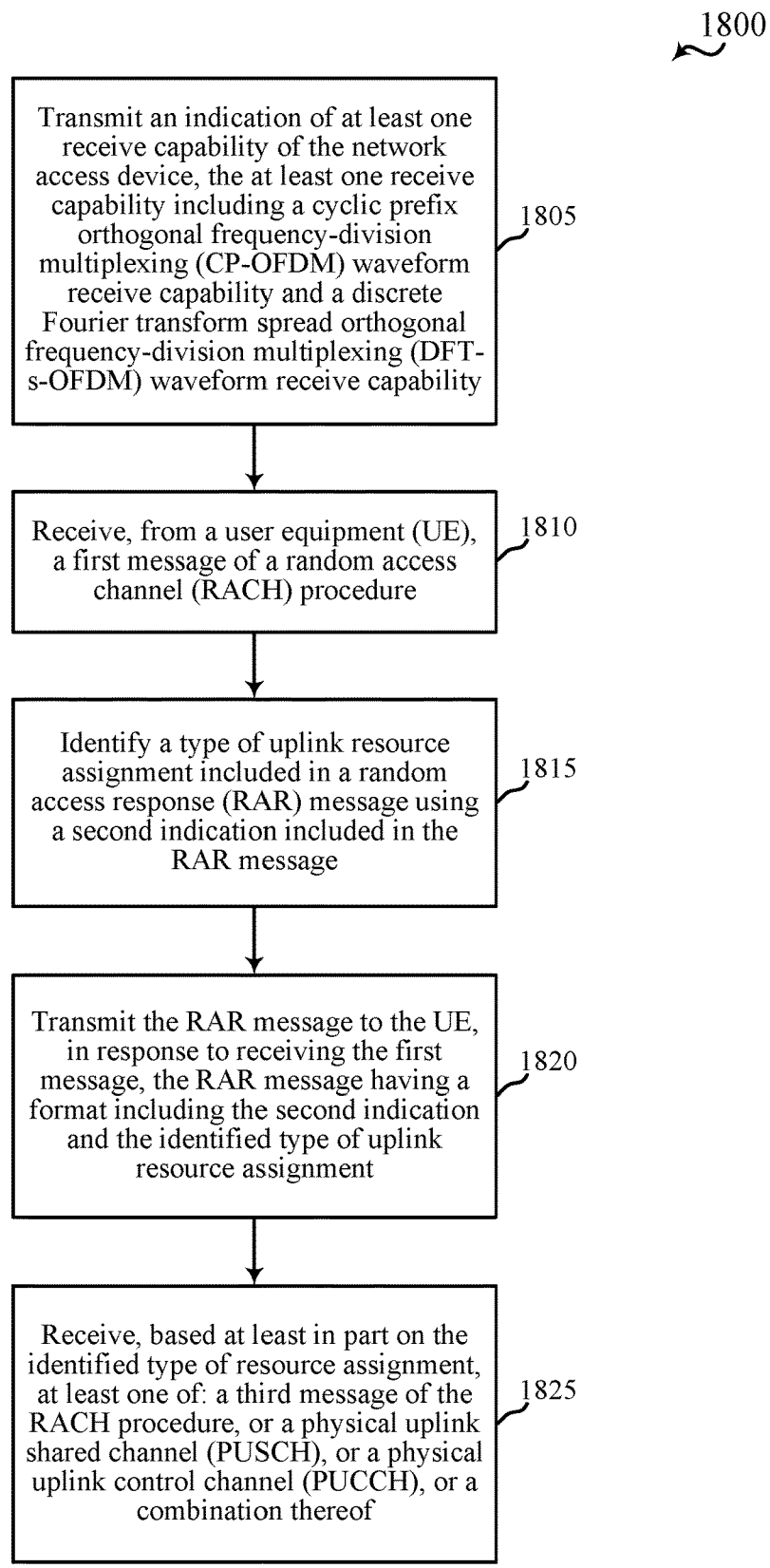
FIG. 18 is a flow chart illustrating an example of a method for wireless communication at a network access device (e.g., a smart radio head, ANC, or gNB), in accordance with one or more aspects of the present disclosure.

FIG. 18 is a flow chart illustrating an example of a method 1800 for wireless communication at a network access device (e.g., a smart radio head, ANC, or gNB), in accordance with one or more aspects of the present disclosure. For clarity, the method 1800 is described below with reference to aspects of one or more of the network access devices described with reference to FIG. 1, 5, 6, or 12, aspects of the apparatus described with reference to FIG. 9, or aspects of one or more of the wireless communication managers described with reference to FIG. 1, 9, 10, or 12. In some examples, a network access device may execute one or more sets of codes to control the functional elements of the network access device to perform the functions described below. Additionally or alternatively, the network access device may perform one or more of the functions described below using special-purpose hardware.

At block 1805, the method 1800 may include transmitting an indication of at least one receive capability of the network access device. By way of example, the at least one receive capability may include a CP-OFDM waveform receive capability and a DFT-s-OFDM waveform receive capability. In some examples, the indication of the at least one receive capability of the network access device may be transmitted in system information. In some examples, the system information may be transmitted in at least one of a MIB transmitted on a PBCH, or a MSIB transmitted on a PDSCH, or a combination thereof. In certain examples, the operation(s) at block 1805 may be performed using the receive capability indicator 935 or 1035 described with reference to FIG. 9 or 10.

At block 1810, the method 1800 may include receiving, from a UE, a first message of a RACH procedure. In some examples, such as when the RACH procedure is performed during an initial access or as the UE transitions to a RRC Connected Mode state, the first message may be received according to a predetermined uplink resource assignment. The predetermined uplink resource assignment may include, for example, a CP-OFDM waveform resource assignment or a DFT-s-OFDM waveform resource assignment. In other examples, the first message may be received according to an uplink resource assignment identified to the UE by the network access device. For example, when the UE is in a Connected Mode (e.g., the RRC_ACTIVE state 405 described with reference to FIG. 4) and performs a RACH procedure in conjunction with a handover from the network access device that is performing the method 1800 (i.e., a source network access device or serving network access device) to a target network access device, the uplink resource assignment for the first message may be identified (e.g., by the network access device that is performing the method 1800) in conjunction with the handover (e.g., in a HO command transmitted to the UE). In certain examples, the operation(s) at block 1810 may be performed using the RACH procedure manager 940 or 1040 described with reference to FIG. 9 or 10.

At block 1815, and when the at least one receive capability includes a CP-OFDM waveform receive capability and a DFT-s-OFDM receive capability, the method 1800 may include identifying a type of uplink resource assignment included in a RAR message. The type of uplink resource assignment included in the RAR message may be identified using a second indication included in the RAR message. The identified type of uplink resource assignment may include a CP-OFDM waveform resource assignment or a DFT-s-OFDM waveform resource assignment. In certain examples, the operation(s) at block 1815 may be performed using the uplink resource identifier 1045 described with reference to FIG. 10.

At block 1820, the method 1800 may include transmitting the RAR message, to the UE, in response to receiving the first message. The RAR message may have a format based at least in part on the at least one receive capability of the network access device. When the at least one receive capability includes a CP-OFDM waveform receive capability and a DFT-s-OFDM receive capability, and in some examples, the format of the RAR message may include the second indication described with reference to block 1815 and the identified type of uplink resource assignment. In certain examples, the operation(s) at block 1820 may be performed using the RACH procedure manager 940 or 1040 described with reference to FIG. 9 or 10.

At block 1825, the method 1800 may include receiving, based at least in part on the type of uplink resource assignment included in the RAR message, at least one of a third message of the RACH procedure (e.g., a Msg3 of a four-step RACH procedure transmitted on a PUSCH), or a PUSCH or a PUCCH (e.g., a PUSCH or a PUCCH transmitted following a two-step RACH procedure), or a combination thereof. In certain examples, the operation(s) at block 1825 may be performed using the RACH procedure manager 940 or 1040 described with reference to FIG. 9 or 10, or the uplink reception manager 1050 described with reference to FIG. 10.

The methods 1300, 1400, 1500, 1600, 1700, and 1800 described with reference to FIGS. 13, 14, 15, 16, 17, and 18 may provide for wireless communication. It should be noted that the methods 1300, 1400, 1500, 1600, 1700, and 1800 are example implementations, and the operations of the methods 1300, 1400, 1500, 1600, 1700, and 1800 may be rearranged, combined with other operations of the same or different method, or otherwise modified, such that other implementations are possible. Operations may also be added to the methods 1300, 1400, 1500, 1600, 1700, and 1800.

In some examples, the method may include identifying, based at least in part on the indication, only a CP-OFDM waveform receive capability of the network access device; and interpreting an uplink resource assignment included in the RAR message as a CP-OFDM waveform resource assignment. In some examples, the method may include transmitting, based at least in part on the uplink resource assignment included in the RAR message, at least one of: a third message of the RACH procedure, or a PUSCH, or a PUCCH, or a combination thereof.

In some examples, the method may include identifying, based at least in part on the indication, a CP-OFDM waveform receive capability and a DFT-s-OFDM waveform receive capability of the network access device; determining a type of uplink resource assignment included in the RAR message based at least in part on a second indication included in the RAR message; and interpreting an uplink resource assignment included in the RAR message as the determined type of uplink resource assignment. In some examples, the determined type of uplink resource assignment may include a CP-OFDM waveform resource assignment or a DFT-s-OFDM waveform resource assignment. In some examples, the method may include transmitting, based at least in part on the uplink resource assignment included in the RAR message, at least one of: a third message of the RACH procedure, or a PUSCH, or a PUCCH, or a combination thereof.

In some examples, the indication of the at least one receive capability of the network access device may be received in system information. In some examples, the system information may be received in at least one of: a MIB received on a PBCH, or a MSIB received on a PDSCH, or a combination thereof. In some examples, the first message may be transmitted according to a predetermined uplink resource assignment. In some examples, the predetermined uplink resource assignment may include a CP-OFDM waveform resource assignment or a DFT-s-OFDM waveform resource assignment.

In some examples, the apparatus may include means for identifying, based at least in part on the indication, only a CP-OFDM waveform receive capability of the network access device; and means for interpreting an uplink resource assignment included in the RAR message as a CP-OFDM waveform resource assignment. In some examples, the apparatus may include means for transmitting, based at least in part on the uplink resource assignment included in the RAR message, at least one of: a third message of the RACH procedure, or a PUSCH, or a PUCCH, or a combination thereof.

In some examples, the apparatus may include means for identifying, based at least in part on the indication, a CP-OFDM waveform receive capability and a DFT-s-OFDM waveform receive capability of the network access device; means for determining a type of uplink resource assignment included in the RAR message based at least in part on a second indication included in the RAR message; and means for interpreting an uplink resource assignment included in the RAR message as the determined type of uplink resource assignment. In some examples, the determined type of uplink resource assignment may include a CP-OFDM waveform resource assignment or a DFT-s-OFDM waveform resource assignment. In some examples, the apparatus may include means for transmitting, based at least in part on the uplink resource assignment included in the RAR message, at least one of: a third message of the RACH procedure, or a PUSCH, or a PUCCH, or a combination thereof.

In some examples of the apparatus, the indication of the at least one receive capability of the network access device may be received in system information. In some examples, the system information may be received in at least one of: a MIB received on a PBCH, or a MSIB received on a PDSCH, or a combination thereof. In some examples, the first message may be transmitted according to a predetermined uplink resource assignment. In some examples, the predetermined uplink resource assignment may include a CP-OFDM waveform resource assignment or a DFT-s-OFDM waveform resource assignment. In some examples of the apparatus, the instructions may be executable by the processor to identify, based at least in part on the indication, only a CP-OFDM waveform receive capability of the network access device; and to interpret an uplink resource assignment included in the RAR message as a CP-OFDM waveform resource assignment. In some examples, the instructions may be executable by the processor to transmit, based at least in part on the uplink resource assignment included in the RAR message, at least one of: a third message of the RACH procedure, or a PUSCH, or a PUCCH, or a combination thereof.

In some examples of the apparatus, the instructions may be executable by the processor to identify, based at least in part on the indication, a CP-OFDM waveform receive capability and a DFT-s-OFDM waveform receive capability of the network access device; to determine a type of uplink resource assignment included in the RAR message based at least in part on a second indication included in the RAR message; and to interpret an uplink resource assignment included in the RAR message as the determined type of uplink resource assignment. In some examples, the determined type of uplink resource assignment may include a CP-OFDM waveform resource assignment or a DFT-s-OFDM waveform resource assignment. In some examples, the instructions may be executable by the processor to transmit, based at least in part on the uplink resource assignment included in the RAR message, at least one of: a third message of the RACH procedure, or a PUSCH, or a PUCCH, or a combination thereof.

In some examples of the apparatus, the indication of the at least one receive capability of the network access device may be received in system information. In some examples, the system information may be received in at least one of: a MIB received on a PBCH, or a MSIB received on a PDSCH, or a combination thereof. In some examples, the first message may be transmitted according to a predetermined uplink resource assignment. In some examples, the predetermined uplink resource assignment may include a CP-OFDM waveform resource assignment or a DFT-s-OFDM waveform resource assignment.

In some examples of the non-transitory computer-readable medium, the code may be executable by the processor to identify, based at least in part on the indication, only a CP-OFDM waveform receive capability of the network access device; and to interpret an uplink resource assignment included in the RAR message as a CP-OFDM waveform resource assignment. In some examples of the non-transitory computer-readable medium, the code may be executable by the processor to identify, based at least in part on the indication, a CP-OFDM waveform receive capability and a DFT-s-OFDM waveform receive capability of the network access device; to determine a type of uplink resource assignment included in the RAR message based at least in part on a second indication included in the RAR message; and to interpret an uplink resource assignment included in the RAR message as the determined type of uplink resource assignment.

In some examples of the method, the at least one receive capability may include only a CP-OFDM waveform receive capability, and the format of the RAR message may include a CP-OFDM waveform resource assignment. In some examples, the method may include receiving, based at least in part on the CP-OFDM waveform resource assignment, at least one of: a third message of the RACH procedure, or a PUSCH, or a PUCCH, or a combination thereof.

In some examples of the method, the at least one receive capability may include a CP-OFDM waveform receive capability and a DFT-s-OFDM waveform receive capability, and the method may further include identifying a type of uplink resource assignment included in the RAR message using a second indication included in the RAR message. The format of the RAR message may include the identified type of uplink resource assignment. In some examples, the identified type of uplink resource assignment may include a CP-OFDM waveform resource assignment or a DFT-s-OFDM waveform resource assignment. In some examples, the method may include receiving, based at least in part on the type of uplink resource assignment included in the RAR message, at least one of: a third message of the RACH procedure, or a PUSCH, or a PUCCH, or a combination thereof.

In some examples of the method, the indication of the at least one receive capability of the network access device may be transmitted in system information. In some examples, the transmitted system information may include at least one of: a MIB transmitted on a PBCH, or a MSIB transmitted on a PDSCH, or a combination thereof. In some examples, the first message may be received according to a predetermined uplink resource assignment. In some examples, the predetermined uplink resource assignment may include a CP-OFDM waveform resource assignment or a DFT-s-OFDM waveform resource assignment.

In some examples of the apparatus, the at least one receive capability may include only a CP-OFDM waveform receive capability, and the format of the RAR message may include a CP-OFDM waveform resource assignment. In some examples, the apparatus may include means for receiving, based at least in part on the CP-OFDM waveform resource assignment, at least one of: a third message of the RACH procedure, or a PUSCH, or a PUCCH, or a combination thereof.

In some examples of the apparatus, the at least one receive capability may include a CP-OFDM waveform receive capability and a DFT-s-OFDM waveform receive capability, and the apparatus may include means for identifying a type of uplink resource assignment included in the RAR message using a second indication included in the RAR message. The format of the RAR message may include the identified type of uplink resource assignment. In some examples, the identified type of uplink resource assignment may include a CP-OFDM waveform resource assignment or a DFT-s-OFDM waveform resource assignment. In some examples, the apparatus may include means for receiving, based at least in part on the type of uplink resource assignment included in the RAR message, at least one of: a third message of the RACH procedure, or a PUSCH, or a PUCCH, or a combination thereof.

In some examples of the apparatus, the indication of the at least one receive capability of the network access device may be transmitted in system information. In some examples, the transmitted system information may include at least one of: a MIB transmitted on a PBCH, or a MSIB transmitted on a PDSCH, or a combination thereof. In some examples, the first message may be received according to a predetermined uplink resource assignment. In some examples, the predetermined uplink resource assignment may include a CP-OFDM waveform resource assignment or a DFT-s-OFDM waveform resource assignment.

In some examples of the apparatus, the at least one receive capability may include only a CP-OFDM waveform receive capability, and the format of the RAR message may include a CP-OFDM waveform resource assignment. In some examples, the instructions may be executable by the processor to receive, based at least in part on the CP-OFDM waveform resource assignment, at least one of: a third message of the RACH procedure, or a PUSCH, or a PUCCH, or a combination thereof.

In some examples of the apparatus, the at least one receive capability may include a CP-OFDM waveform receive capability and a DFT-s-OFDM waveform receive capability, and the instructions may be executable by the processor to identify a type of uplink resource assignment included in the RAR message using a second indication included in the RAR message. The format of the RAR message may include the identified type of uplink resource assignment. In some examples, the identified type of uplink resource assignment may include a CP-OFDM waveform resource assignment or a DFT-s-OFDM waveform resource assignment. In some examples, the instructions may be executable by the processor to receive, based at least in part on the type of uplink resource assignment included in the RAR message, at least one of: a third message of the RACH procedure, or a PUSCH, or a PUCCH, or a combination thereof.

In some examples of the apparatus, the indication of the at least one receive capability of the network access device may be transmitted in system information. In some examples, the transmitted system information may include at least one of: a MIB transmitted on a PBCH, or a MSIB transmitted on a PDSCH, or a combination thereof. In some examples, the first message may be received according to a predetermined uplink resource assignment. In some examples, the predetermined uplink resource assignment may include a CP-OFDM waveform resource assignment or a DFT-s-OFDM waveform resource assignment.

In some examples of the non-transitory computer-readable medium, the at least one receive capability may include only a CP-OFDM waveform receive capability, and the format of the RAR message may include a CP-OFDM waveform resource assignment. In some examples of the non-transitory computer-readable medium, the at least one receive capability may include a CP-OFDM waveform receive capability and a DFT-s-OFDM waveform receive capability, and the code may be executable by the processor to identify a type of uplink resource assignment included in the RAR message using a second indication included in the RAR message. The format of the RAR message may include the identified type of uplink resource assignment.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members.

As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
receiving an indication of at least one receive capability of a network access device;
transmitting a first message of a random access channel (RACH) procedure;
receiving a random access response (RAR) message in response to transmitting the first message;
interpreting the RAR message according to a format based at least in part on the received indication;
identifying, based at least in part on the indication, both a CP-OFDM waveform receive capability and a discrete Fourier transform spread orthogonal frequency-division multiplexing (DFT-s-OFDM) waveform receive capability of the network access device;
determining a type of uplink resource assignment included in the RAR message based at least in part on a second indication included in the RAR message; and
interpreting an uplink resource assignment included in the RAR message as the determined type of uplink resource assignment.

2. The method of claim 1, further comprising:
identifying, based at least in part on the indication, only a cyclic prefix orthogonal frequency-division multiplexing (CP-OFDM) waveform receive capability of the network access device; and
interpreting an uplink resource assignment included in the RAR message as a CP-OFDM waveform resource assignment.

3. The method of claim 2, further comprising:
transmitting, based at least in part on the uplink resource assignment included in the RAR message, at least one of: a third message of the RACH procedure, or a physical uplink shared channel (PUSCH), or a physical uplink control channel (PUCCH), or a combination thereof.

4. The method of claim 1, wherein the determined type of uplink resource assignment comprises a CP-OFDM waveform resource assignment or a DFT-s-OFDM waveform resource assignment.

5. The method of claim 1, further comprising:
transmitting, based at least in part on the uplink resource assignment included in the RAR message, at least one of: a third message of the RACH procedure, or a PUSCH, or a PUCCH, or a combination thereof.

6. The method of claim 1, wherein the indication of the at least one receive capability of the network access device is received in system information.

7. The method of claim 6, wherein the system information is received in at least one of: a minimum system information (MSI) received on a physical broadcast channel (PBCH), or a remaining minimum system information (RMSI) received on a physical downlink shared channel (PDSCH), or a combination thereof.

8. The method of claim 1, wherein the first message is transmitted according to a predetermined uplink resource assignment.

9. The method of claim 8, wherein the predetermined uplink resource assignment comprises a CP-OFDM waveform resource assignment or a DFT-s-OFDM waveform resource assignment.

10. An apparatus for wireless communication at a user equipment (UE), comprising:
means for receiving an indication of at least one receive capability of a network access device;
means for transmitting a first message of a random access channel (RACH) procedure;
means for receiving a random access response (RAR) message in response to transmitting the first message;
means for interpreting the RAR message according to a format based at least in part on the received indication;
means for identifying, based at least in part on the indication, both a CP-OFDM waveform receive capability and a discrete Fourier transform spread orthogonal frequency- division multiplexing (DFT-s-OFDM) waveform receive capability of the network access device;

means for determining a type of uplink resource assignment included in the RAR message based at least in part on a second indication included in the RAR message; and means for interpreting an uplink resource assignment included in the RAR message as the determined type of uplink resource assignment.

11. The apparatus of claim 10, further comprising:

means for identifying, based at least in part on the indication, only a cyclic prefix orthogonal frequency-division multiplexing (CP-OFDM) waveform receive capability of the network access device; and means for interpreting an uplink resource assignment included in the RAR message as a CP-OFDM waveform resource assignment.

12. The apparatus of claim 11, further comprising:

means for transmitting, based at least in part on the uplink resource assignment included in the RAR message, at least one of: a third message of the RACH procedure, or a physical uplink shared channel (PUSCH), or a physical uplink control channel (PUCCH), or a combination thereof.

13. The apparatus of claim 10, wherein the determined type of uplink resource assignment comprises a CP-OFDM waveform resource assignment or a DFT-s-OFDM waveform resource assignment.

14. The apparatus of claim 10, further comprising:

means for transmitting, based at least in part on the uplink resource assignment included in the RAR message, at least one of: a third message of the RACH procedure, or a PUSCH, or a PUCCH, or a combination thereof.

15. The apparatus of claim 10, wherein the indication of the at least one receive capability of the network access device is received in system information.

16. The apparatus of claim 15, wherein the system information is received in at least one of: a minimum system information (MSI) received on a physical broadcast channel (PBCH), or a remaining minimum system information (RMSI) received on a physical downlink shared channel (PDSCH), or a combination thereof.

17. The apparatus of claim 10, wherein the first message is transmitted according to a predetermined uplink resource assignment.

18. The apparatus of claim 17, wherein the predetermined uplink resource assignment comprises a CP-OFDM waveform resource assignment or a DFT-s-OFDM waveform resource assignment.

19. An apparatus for wireless communication at a user equipment (UE), comprising:

a processor;

memory in electronic communication with the processor; and instructions stored in the memory, the instructions being executable by the processor to:

receive an indication of at least one receive capability of a network access device;

transmit a first message of a random access channel (RACH) procedure;

receive a random access response (RAR) message in response to transmitting the first message;

interpret the RAR message according to a format based at least in part on the received indication;

wherein the instructions are executable by the processor to:

identify, based at least in part on the indication, both a CP-OFDM waveform receive capability and a discrete Fourier transform spread orthogonal frequency-division multiplexing (DFT-s-OFDM) waveform receive capability of the network access device;

determine a type of uplink resource assignment included in the RAR message based at least in part on a second indication included in the RAR message; and interpret an uplink resource assignment included in the RAR message as the determined type of uplink resource assignment.

20. The apparatus of claim 19, wherein the instructions are executable by the processor to:

identify, based at least in part on the indication, only a cyclic prefix orthogonal frequency-division multiplexing (CP-OFDM) waveform receive capability of the network access device; and interpret an uplink resource assignment included in the RAR message as a CP- OFDM waveform resource assignment.

21. The apparatus of claim 20, wherein the instructions are executable by the processor to:

transmit, based at least in part on the uplink resource assignment included in the RAR message, at least one of: a third message of the RACH procedure, or a physical uplink shared channel (PUSCH), or a physical uplink control channel (PUCCH), or a combination thereof.

22. The apparatus of claim 19, wherein the determined type of uplink resource assignment comprises a CP-OFDM waveform resource assignment or a DFT-s-OFDM waveform resource assignment.

23. The apparatus of claim 19, wherein the instructions are executable by the processor to:

transmit, based at least in part on the uplink resource assignment included in the RAR message, at least one of: a third message of the RACH procedure, or a PUSCH, or a PUCCH, or a combination thereof.

24. The apparatus of claim 19, wherein the indication of the at least one receive capability of the network access device is received in system information.

25. The apparatus of claim 24, wherein the system information is received in at least one of: a minimum system information (MSI) received on a physical broadcast channel (PBCH), or a remaining minimum system information (RMSI) received on a physical downlink shared channel (PDSCH), or a combination thereof.

26. The apparatus of claim 19, wherein the first message is transmitted according to a predetermined uplink resource assignment.

27. The apparatus of claim 26, wherein the predetermined uplink resource assignment comprises a CP-OFDM waveform resource assignment or a DFT-s-OFDM waveform resource assignment.

28. A non-transitory computer-readable medium storing computer-executable code for wireless communication at a user equipment (UE), the code executable by a processor to:

receive an indication of at least one receive capability of a network access device;

transmit a first message of a random access channel (RACH) procedure;

receive a random access response (RAR) message in response to transmitting the first message;

interpret the RAR message according to a format based at least in part on the received indication;

wherein the code is executable by the processor to:

identify, based at least in part on the indication, both a CP-OFDM waveform receive capability and a discrete Fourier transform spread orthogonal frequency-division multiplexing (DFT-s-OFDM) waveform receive capability of the network access device;
determine a type of uplink resource assignment included in the RAR message based at least in part on a second indication included in the RAR message; and
interpret an uplink resource assignment included in the RAR message as the determined type of uplink resource assignment.

29. The non-transitory computer-readable medium of claim 28, wherein the code is executable by the processor to:
identify, based at least in part on the indication, only a cyclic prefix orthogonal frequency-division multiplexing (CP-OFDM) waveform receive capability of the network access device; and
interpret an uplink resource assignment included in the RAR message as a CP-OFDM waveform resource assignment.

30. A method for wireless communication at a network access device, comprising:
transmitting an indication of at least one receive capability of the network access device;
receiving, from a user equipment (UE), a first message of a random access channel (RACH) procedure;
transmitting a random access response (RAR) message to the UE, in response to receiving the first message, the RAR message having a format based at least in part on the at least one receive capability of the network access device;
wherein the at least one receive capability comprises both a CP-OFDM waveform receive capability and a discrete Fourier transform spread orthogonal frequency-division multiplexing (DFT-s-OFDM) waveform receive capability, the method further comprising:
identifying a type of uplink resource assignment included in the RAR message using a second indication included in the RAR message, wherein the format of the RAR message comprises the identified type of uplink resource assignment.

31. The method of claim 30, wherein the at least one receive capability comprises only a cyclic prefix orthogonal frequency-division multiplexing (CP-OFDM) waveform receive capability, and the format of the RAR message comprises a CP-OFDM waveform resource assignment.

32. The method of claim 31, further comprising:
receiving, based at least in part on the CP-OFDM waveform resource assignment, at least one of: a third message of the RACH procedure, or a physical uplink shared channel (PUSCH), or a physical uplink control channel (PUCCH), or a combination thereof.

33. The method of claim 30, wherein the identified type of uplink resource assignment comprises a CP-OFDM waveform resource assignment or a DFT-s-OFDM waveform resource assignment.

34. The method of claim 30, further comprising:
receiving, based at least in part on the type of uplink resource assignment included in the RAR message, at least one of: a third message of the RACH procedure, or a PUSCH, or a PUCCH, or a combination thereof.

35. The method of claim 30, wherein the indication of the at least one receive capability of the network access device is transmitted in system information.

36. The method of claim 35, wherein the transmitted system information comprises at least one of: a minimum system information (MSI) transmitted on a physical broadcast channel (PBCH), or a remaining minimum system information (RMSI) transmitted on a physical downlink shared channel (PDSCH), or a combination thereof.

37. The method of claim 30, wherein the first message is received according to a predetermined uplink resource assignment.

38. The method of claim 37, wherein the predetermined uplink resource assignment comprises a CP-OFDM waveform resource assignment or a DFT-s-OFDM waveform resource assignment.

39. An apparatus for wireless communication at a network access device, comprising:
means for transmitting an indication of at least one receive capability of the network access device;
means for receiving, from a user equipment (UE), a first message of a random access channel (RACH) procedure;
means for transmitting a random access response (RAR) message to the UE, in response to receiving the first message, the RAR message having a format based at least in part on the at least one receive capability of the network access device;
wherein the at least one receive capability comprises both a CP-OFDM waveform receive capability and a discrete Fourier transform spread orthogonal frequency-division multiplexing (DFT-s-OFDM) waveform receive capability, the apparatus further comprising:
means for identifying a type of uplink resource assignment included in the RAR message using a second indication included in the RAR message, wherein the format of the RAR message comprises the identified type of uplink resource assignment.

40. The apparatus of claim 39, wherein the at least one receive capability comprises only a cyclic prefix orthogonal frequency-division multiplexing (CP-OFDM) waveform receive capability, and the format of the RAR message comprises a CP-OFDM waveform resource assignment.

41. The apparatus of claim 40, further comprising:
means for receiving, based at least in part on the CP-OFDM waveform resource assignment, at least one of: a third message of the RACH procedure, or a physical uplink shared channel (PUSCH), or a physical uplink control channel (PUCCH), or a combination thereof.

42. The apparatus of claim 39, wherein the identified type of uplink resource assignment comprises a CP-OFDM waveform resource assignment or a DFT-s-OFDM waveform resource assignment.

43. The apparatus of claim 39, further comprising:
means for receiving, based at least in part on the type of uplink resource assignment included in the RAR message, at least one of: a third message of the RACH procedure, or a PUSCH, or a PUCCH, or a combination thereof.

44. The apparatus of claim 39, wherein the indication of the at least one receive capability of the network access device is transmitted in system information.

45. The apparatus of claim 44, wherein the transmitted system information comprises at least one of: a minimum system information (MSI) transmitted on a physical broadcast channel (PBCH), or a remaining minimum system information (RMSI) transmitted on a physical downlink shared channel (PDSCH), or a combination thereof.

46. The apparatus of claim 39, wherein the first message is received according to a predetermined uplink resource assignment.

47. The apparatus of claim 46, wherein the predetermined uplink resource assignment comprises a CP-OFDM waveform resource assignment or a DFT-s-OFDM waveform resource assignment.

48. An apparatus for wireless communication at a network access device, comprising:
- a processor;
- memory in electronic communication with the processor; and
- instructions stored in the memory, the instructions being executable by the processor to:
- transmit an indication of at least one receive capability of the network access device;
- receive, from a user equipment (UE), a first message of a random access channel (RACH) procedure;
- transmit a random access response (RAR) message to the UE, in response to receiving the first message, the RAR message having a format based at least in part on the at least one receive capability of the network access device;
- wherein the at least one receive capability comprises both a CP-OFDM waveform receive capability and a discrete Fourier transform spread orthogonal frequency-division multiplexing (DFT-s-OFDM) waveform receive capability, and wherein the instructions are executable by the processor to:
- identify a type of uplink resource assignment included in the RAR message using a second indication included in the RAR message, wherein the format of the RAR messaae comprises the identified type of uplink resource assianment.

49. The apparatus of claim 48, wherein the at least one receive capability comprises only a cyclic prefix orthogonal frequency-division multiplexing (CP-OFDM) waveform receive capability, and the format of the RAR message comprises a CP-OFDM waveform resource assignment.

50. The apparatus of claim 49, wherein the instructions are executable by the processor to:
- receive, based at least in part on the CP-OFDM waveform resource assignment, at least one of: a third message of the RACH procedure, or a physical uplink shared channel (PUSCH), or a physical uplink control channel (PUCCH), or a combination thereof.

51. The apparatus of claim 48, wherein the identified type of uplink resource assignment comprises a CP-OFDM waveform resource assignment or a DFT-s-OFDM waveform resource assignment.

52. The apparatus of claim 48, wherein the instructions are executable by the processor to:
- receive based at least in part on the type of uplink resource assignment included in the RAR message, at least one of: a third message of the RACH procedure, or a PUSCH, or a PUCCH, or a combination thereof.

53. The apparatus of claim 48, wherein the indication of the at least one receive capability of the network access device is transmitted in system information.

54. The apparatus of claim 53, wherein the transmitted system information comprises at least one of: a minimum system information (MSI) transmitted on a physical broadcast channel (PBCH), or a remaining minimum system information (RMSI) transmitted on a physical downlink shared channel (PDSCH), or a combination thereof.

55. The apparatus of claim 48, wherein the first message is received according to a predetermined uplink resource assignment.

56. The apparatus of claim 55, wherein the predetermined uplink resource assignment comprises a CP-OFDM waveform resource assignment or a DFT-s-OFDM waveform resource assignment.

57. A non-transitory computer-readable medium storing computer-executable code for wireless communication at a network access device, the code executable by a processor to:
- transmit an indication of at least one receive capability of the network access device;
- receive, from a user equipment (UE), a first message of a random access channel (RACH) procedure;
- transmit a random access response (RAR) message to the UE, in response to receiving the first message, the RAR message having a format based at least in part on the at least one receive capability of the network access device;
- wherein the at least one receive capability comprises both a CP-OFDM waveform receive capability and a discrete Fourier transform spread orthogonal frequency-division multiplexing (DFT-s-OFDM) waveform receive capability, and wherein the code is executable by the processor to:
- identify a type of uplink resource assignment included in the RAR message using a second indication included in the RAR message, wherein the format of the RAR message comprises the identified type of uplink resource assignment.

58. The non-transitory computer-readable medium of claim 57, wherein the at least one receive capability comprises only a cyclic prefix orthogonal frequency-division multiplexing (CP-OFDM) waveform receive capability, and the format of the RAR message comprises a CP-OFDM waveform resource assignment.

* * * * *